US010326261B1

(12) United States Patent
Kim

(10) Patent No.: US 10,326,261 B1
(45) Date of Patent: Jun. 18, 2019

(54) ARCHITECTURAL WALL PANELS AND ADORNMENTS FOR CONCEALING INDOOR WIRING AND CABLES

(71) Applicant: Unitoro, LLC, Star, ID (US)

(72) Inventor: Edward J. Kim, Star, ID (US)

(73) Assignee: Unitoro, LLC, Star, ID (US)

( * ) Notice: Subject to any disclaimer, the term of this patent is extended or adjusted under 35 U.S.C. 154(b) by 0 days.

(21) Appl. No.: 15/886,663

(22) Filed: Feb. 1, 2018

(51) Int. Cl.
*H02G 3/04* (2006.01)
*H02G 3/00* (2006.01)

(52) U.S. Cl.
CPC .......... *H02G 3/0431* (2013.01); *H02G 3/266* (2013.01)

(58) Field of Classification Search
CPC .............................. H02G 3/0431; H02G 3/266
USPC .......................................................... 174/481
See application file for complete search history.

(56) References Cited

U.S. PATENT DOCUMENTS

| 4,882,453 A | 11/1989 | Chelsea |
| 5,357,053 A | 10/1994 | Manaras |
| 6,504,098 B2 | 1/2003 | Seamans |
| 9,631,769 B2 * | 4/2017 | McGowan ............ A47B 21/06 |

* cited by examiner

*Primary Examiner* — Dhiru R Patel
(74) *Attorney, Agent, or Firm* — Adsero IP

(57) ABSTRACT

Novel tools and techniques are provided for concealing indoor wiring and cables while serving as architectural wall panels or adornments. In various embodiments, a system of architectural wall panels might include one or more architectural wall panels and a plurality of wall mounts that are removably securable to a wall. Each architectural wall panel might include a front face having a decorative or architectural pattern thereon, a rear face, and two or more mounting protrusions formed on a surface of the rear face. Each mounting protrusion and an adjacent mounting protrusion might form or define a vertical channel having a size through which cables can be disposed when the wall panel is mounted on the wall. The two or more mounting protrusions removably couple with two or more corresponding wall mounts that have been secured to the wall, thereby allowing the wall panel to mount on the wall.

22 Claims, 18 Drawing Sheets

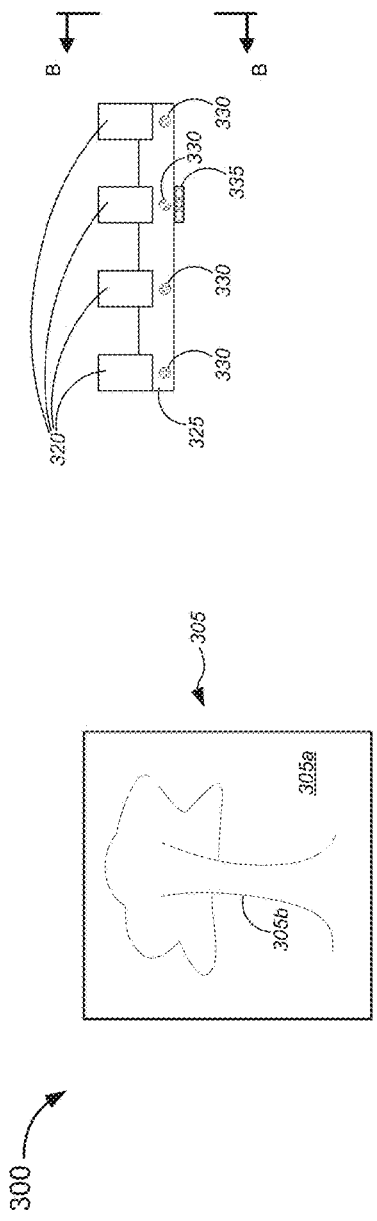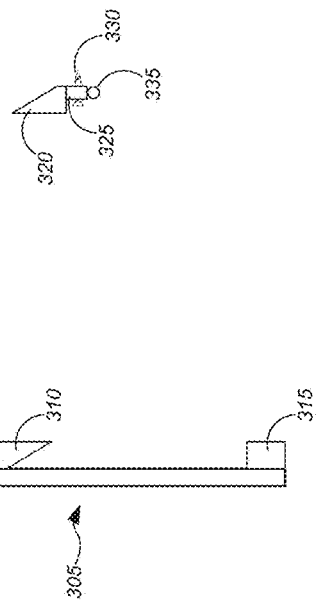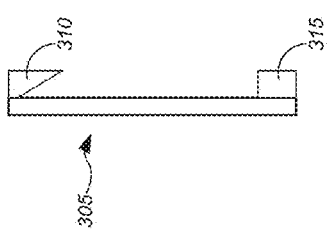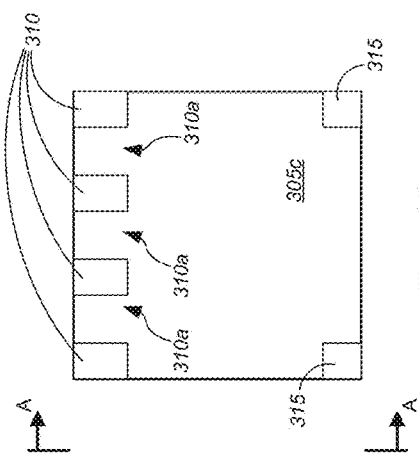

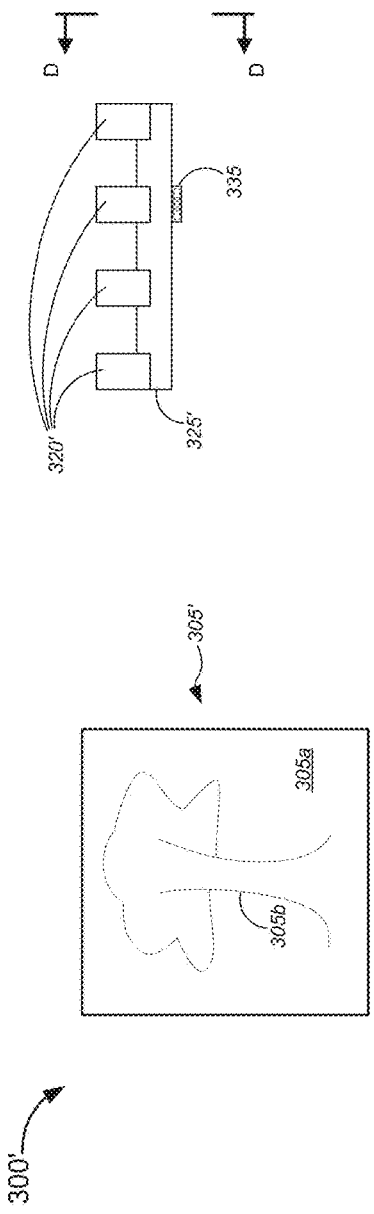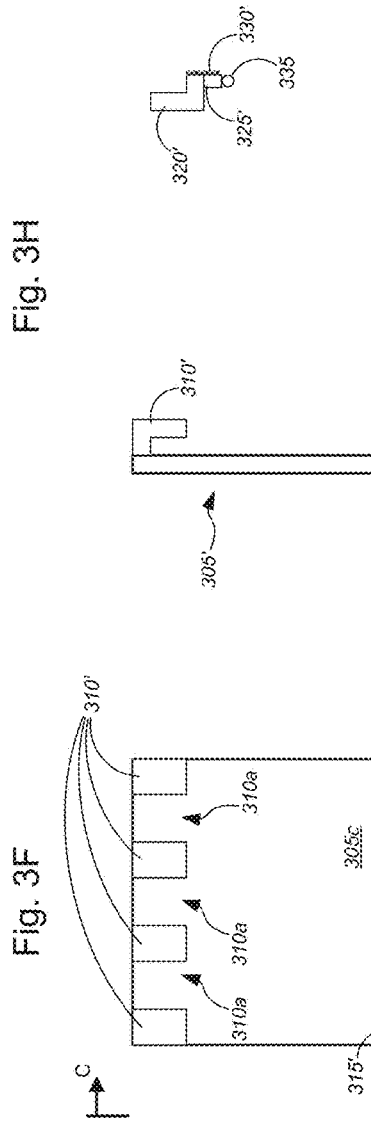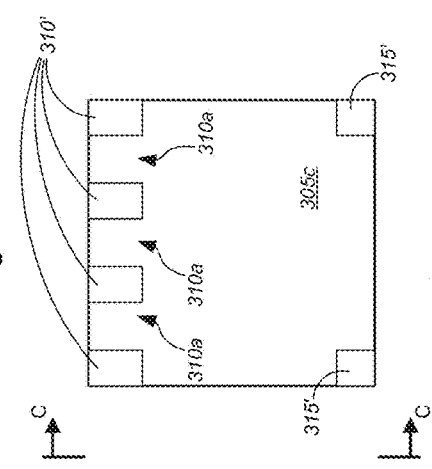

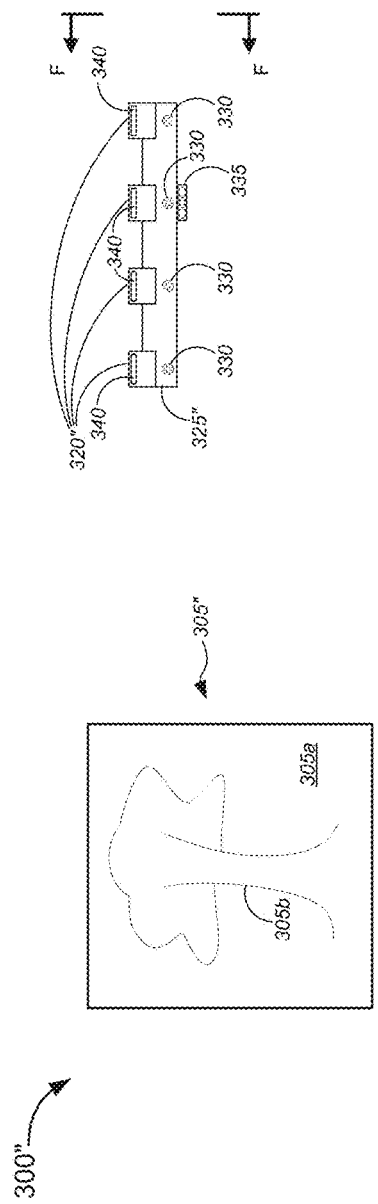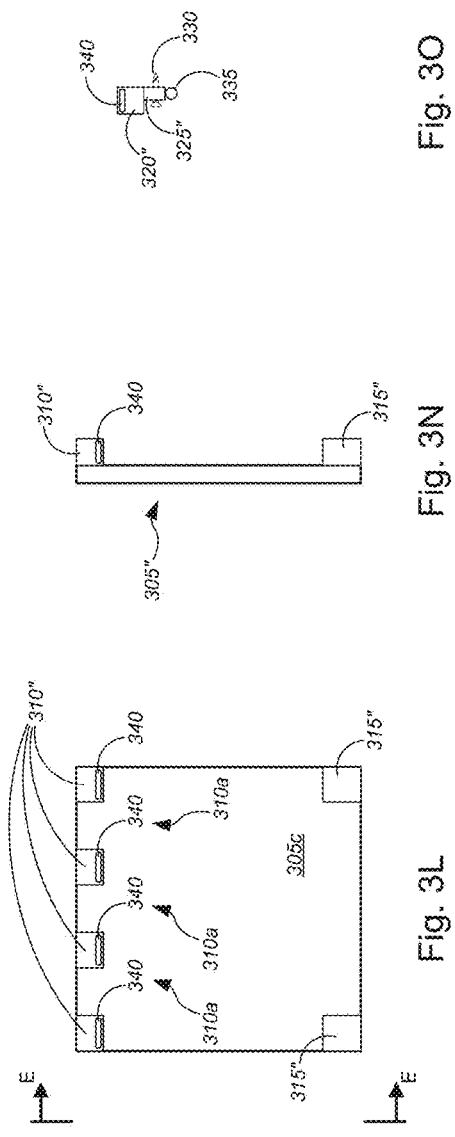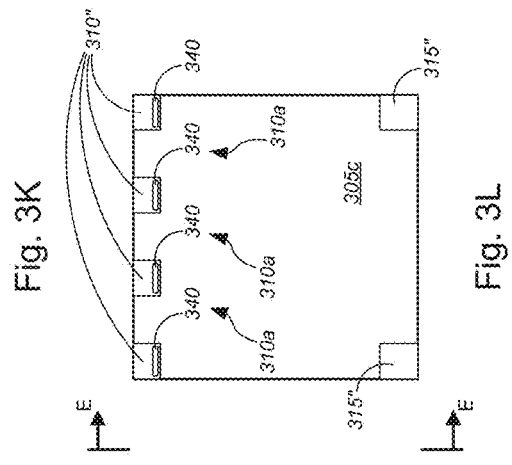

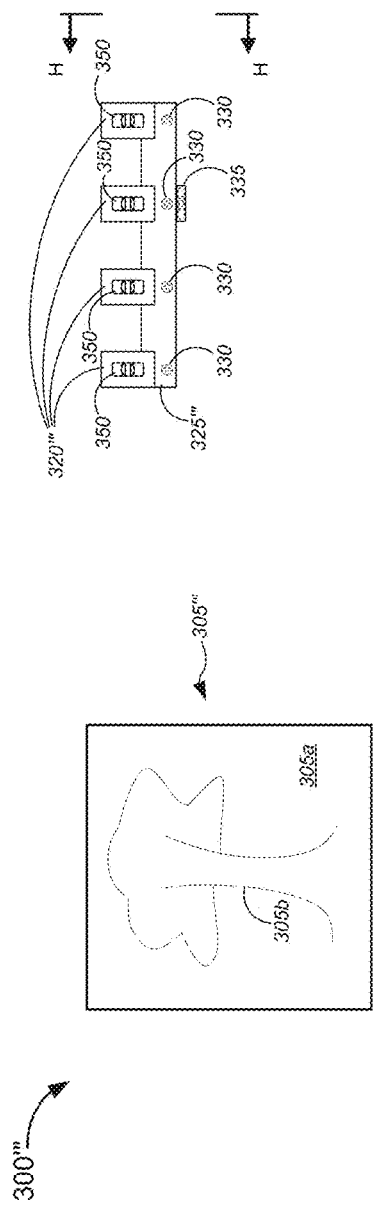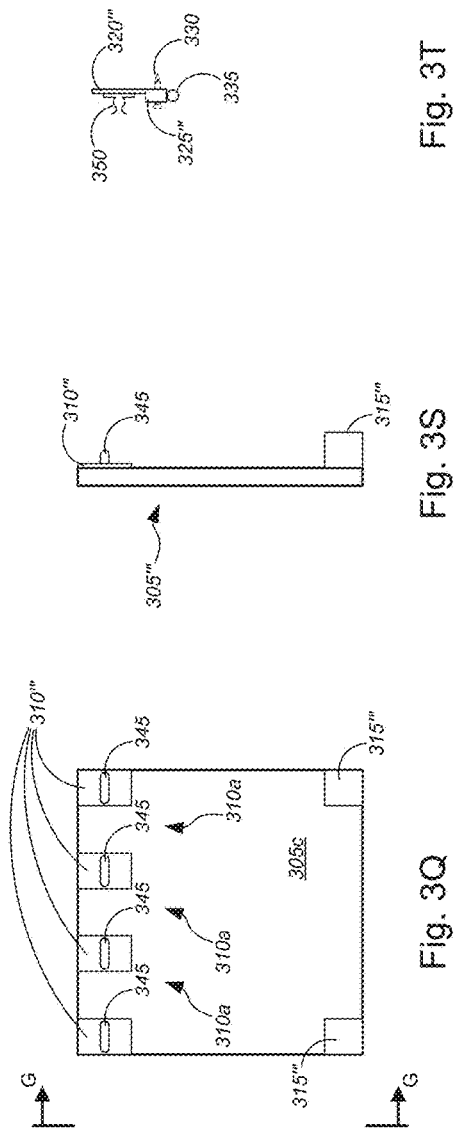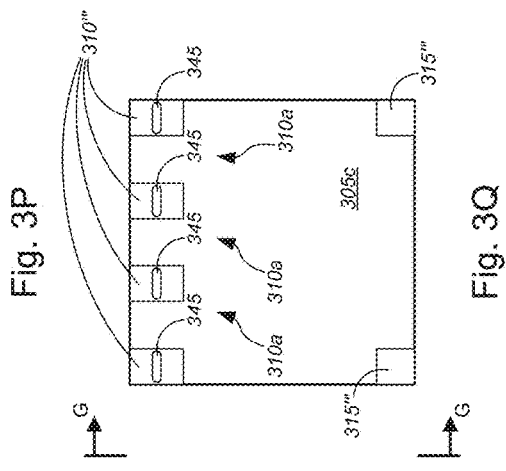

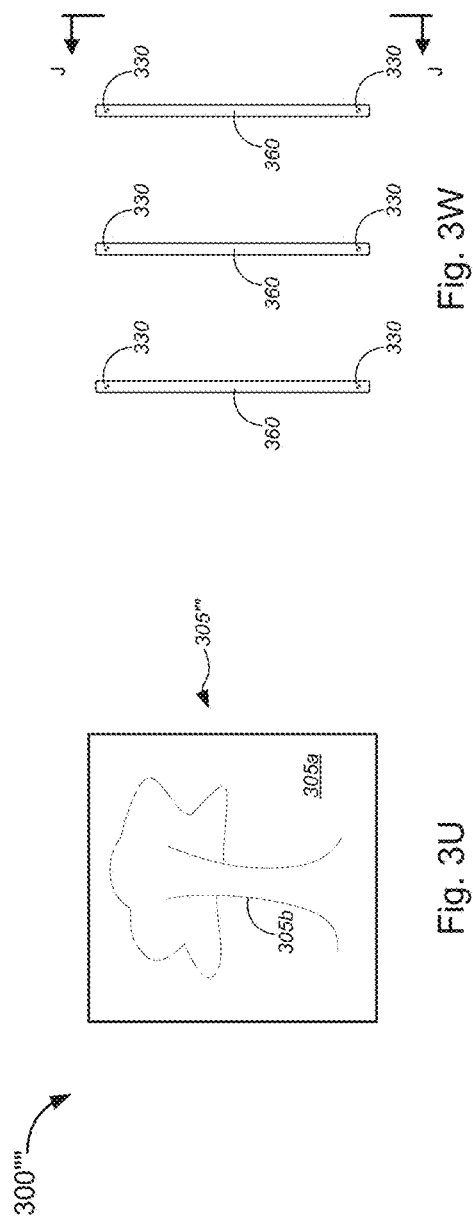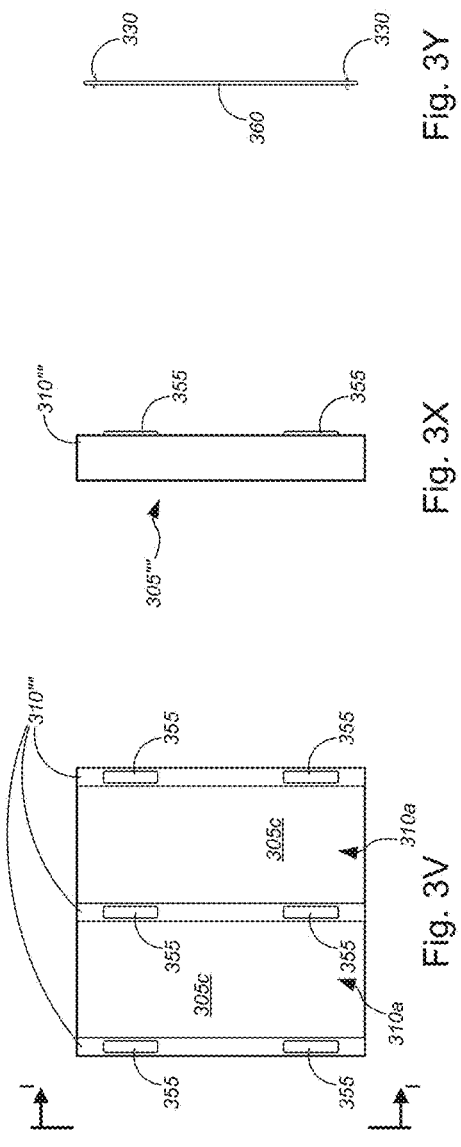

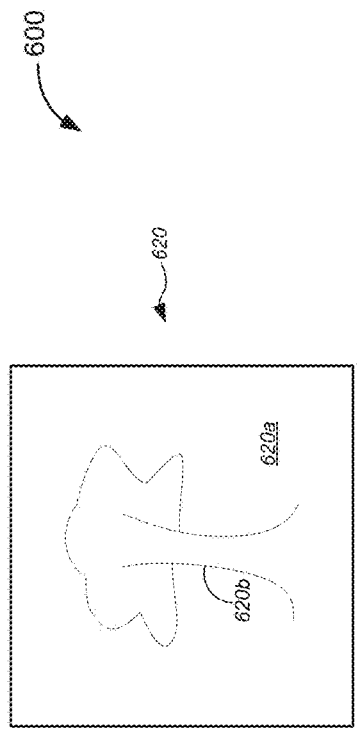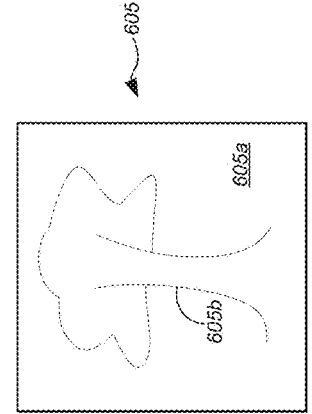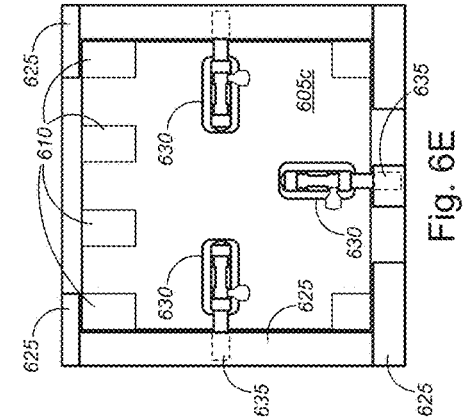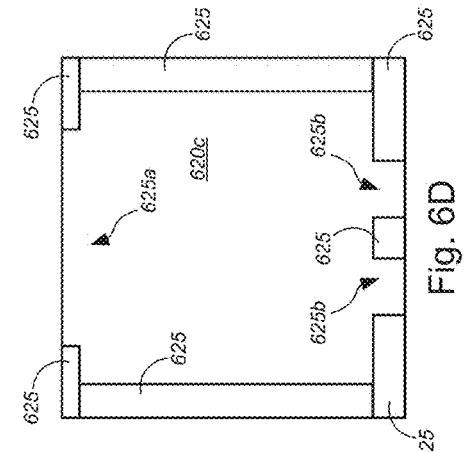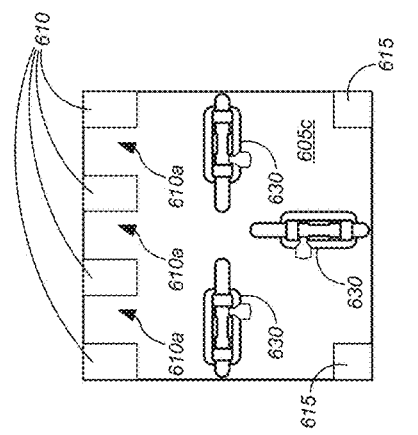

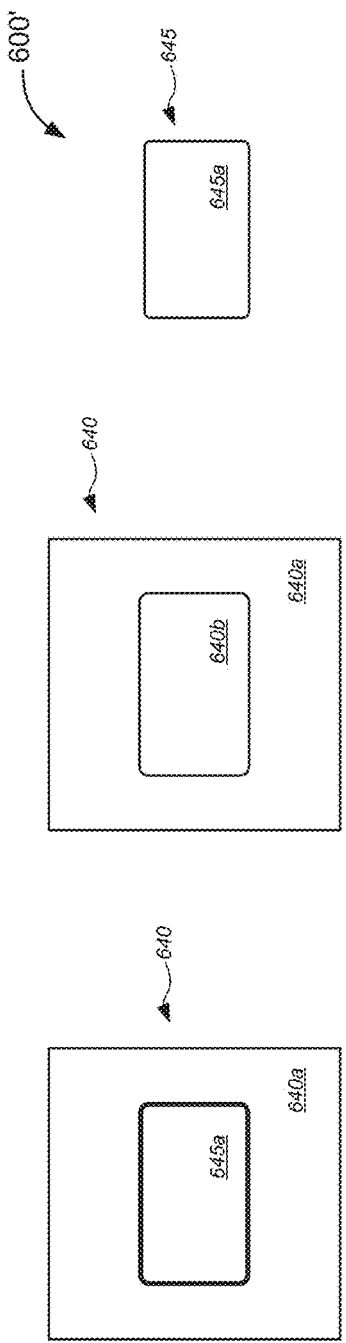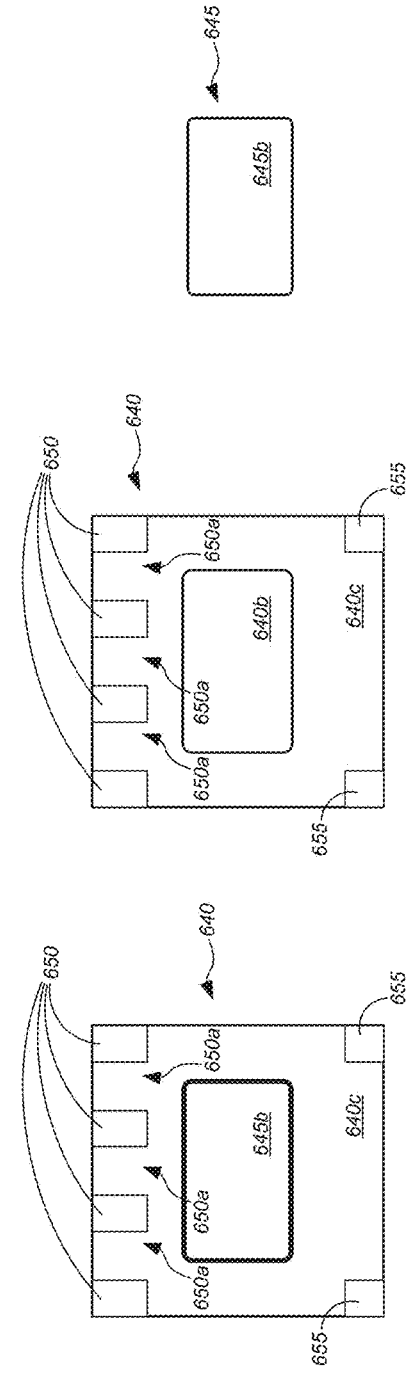

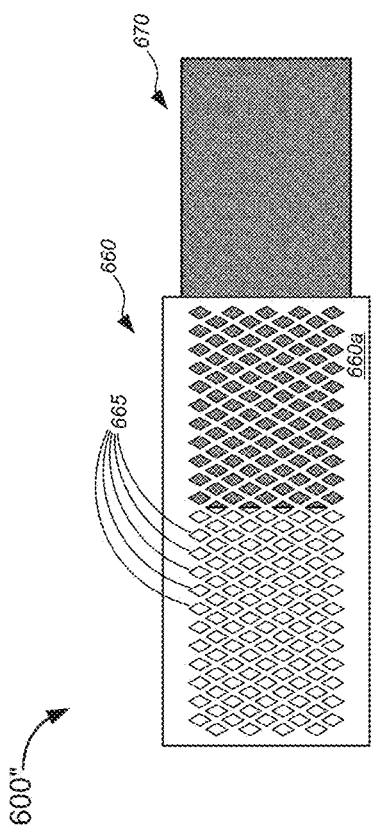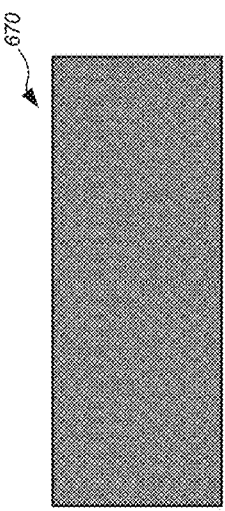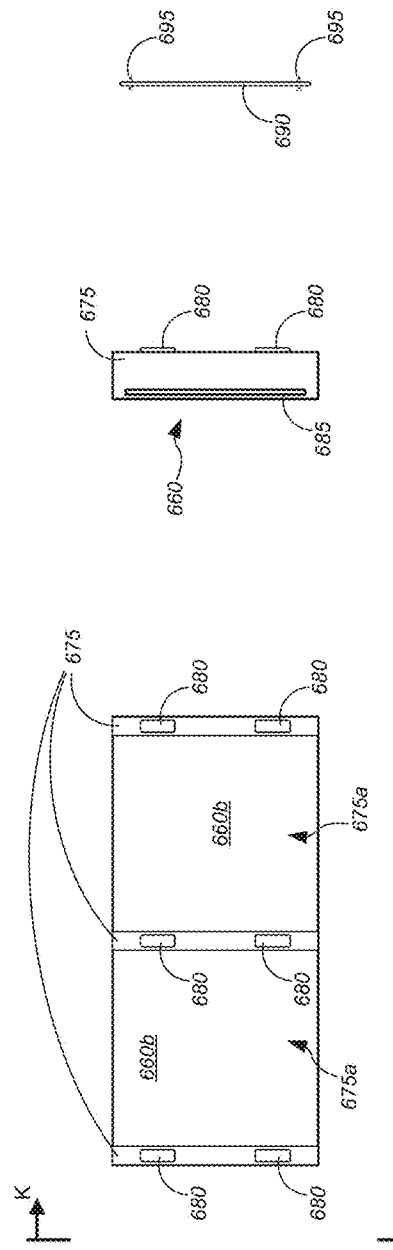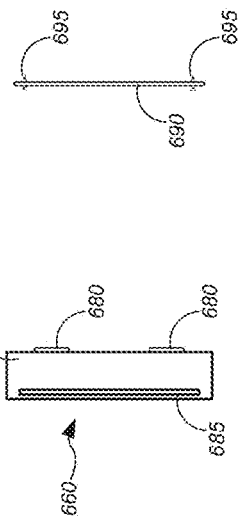
Fig. 6L
Fig. 6M
Fig. 6N
Fig. 6O
Fig. 6P

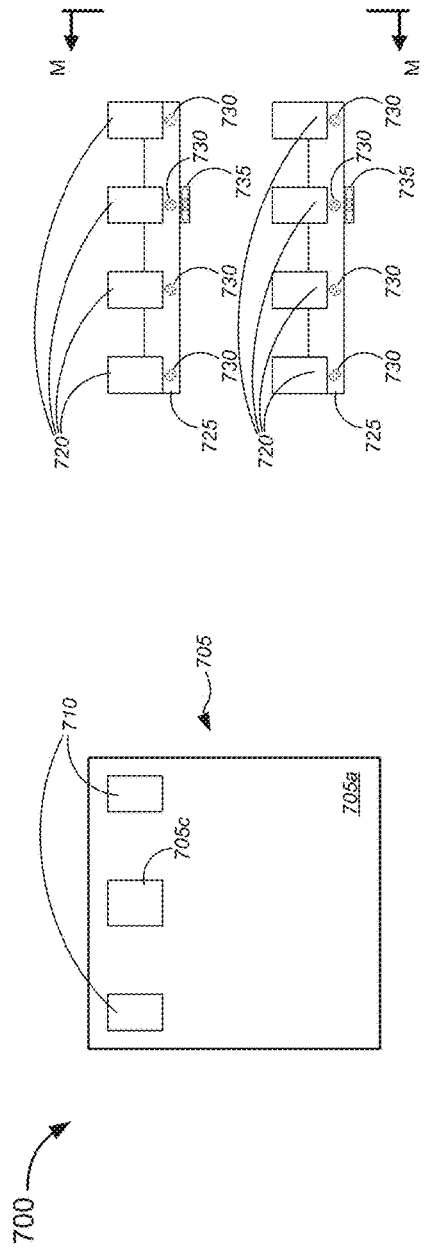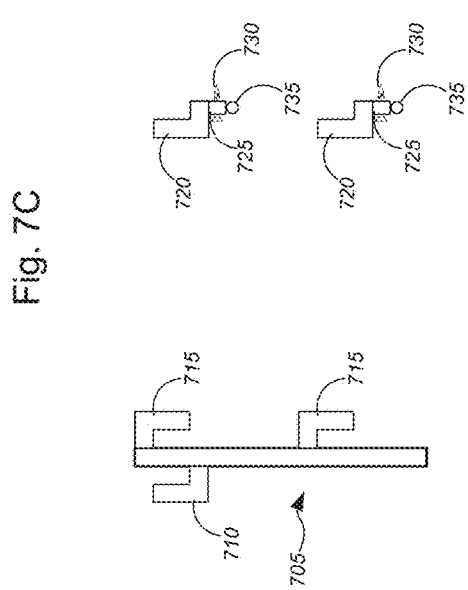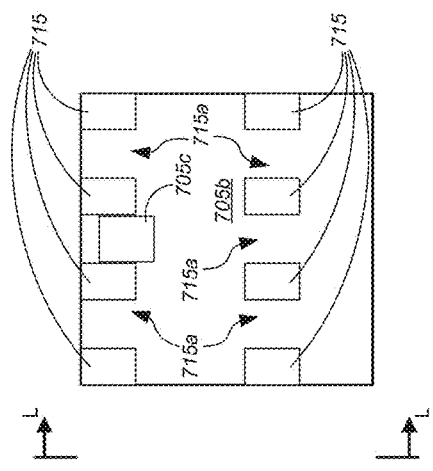

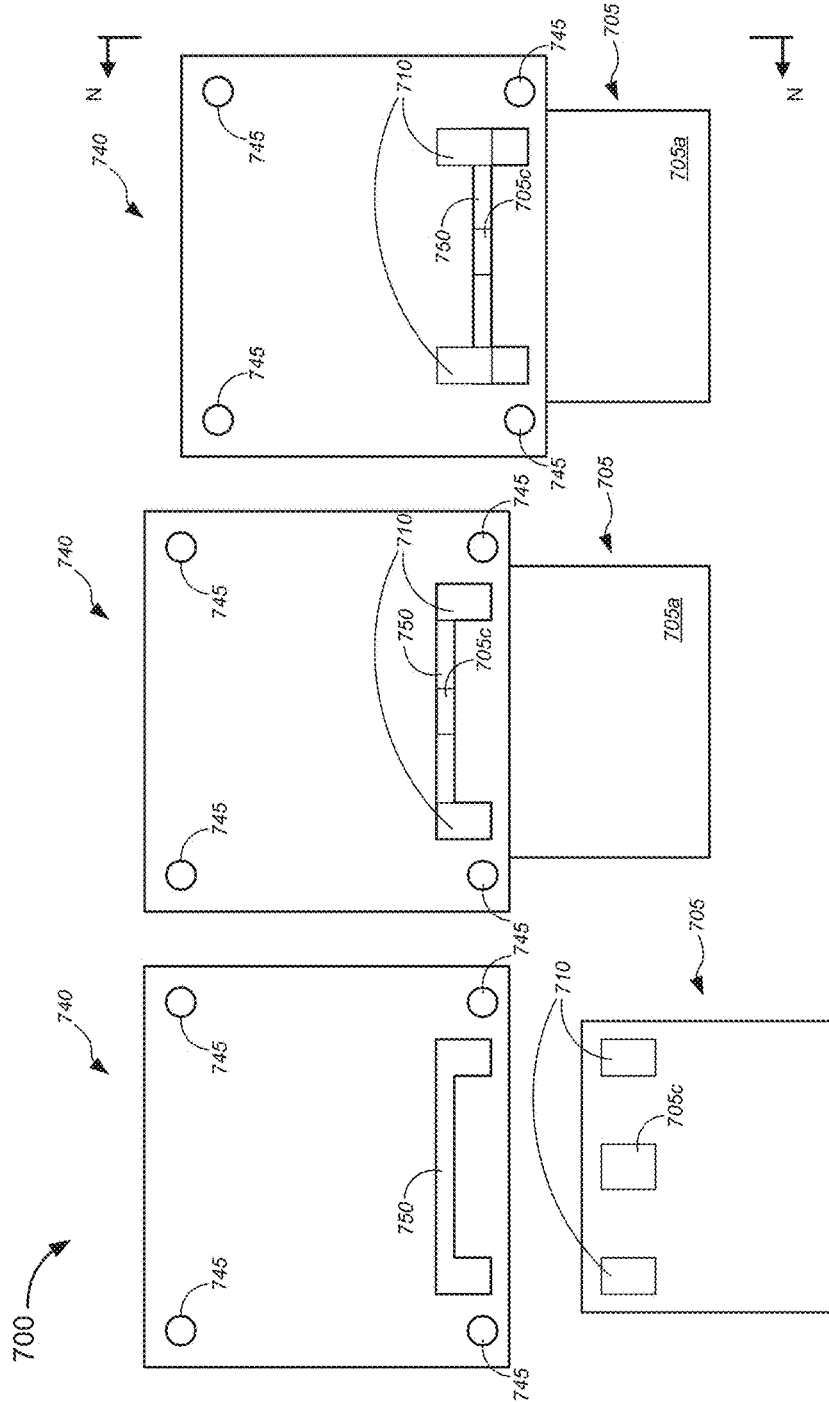

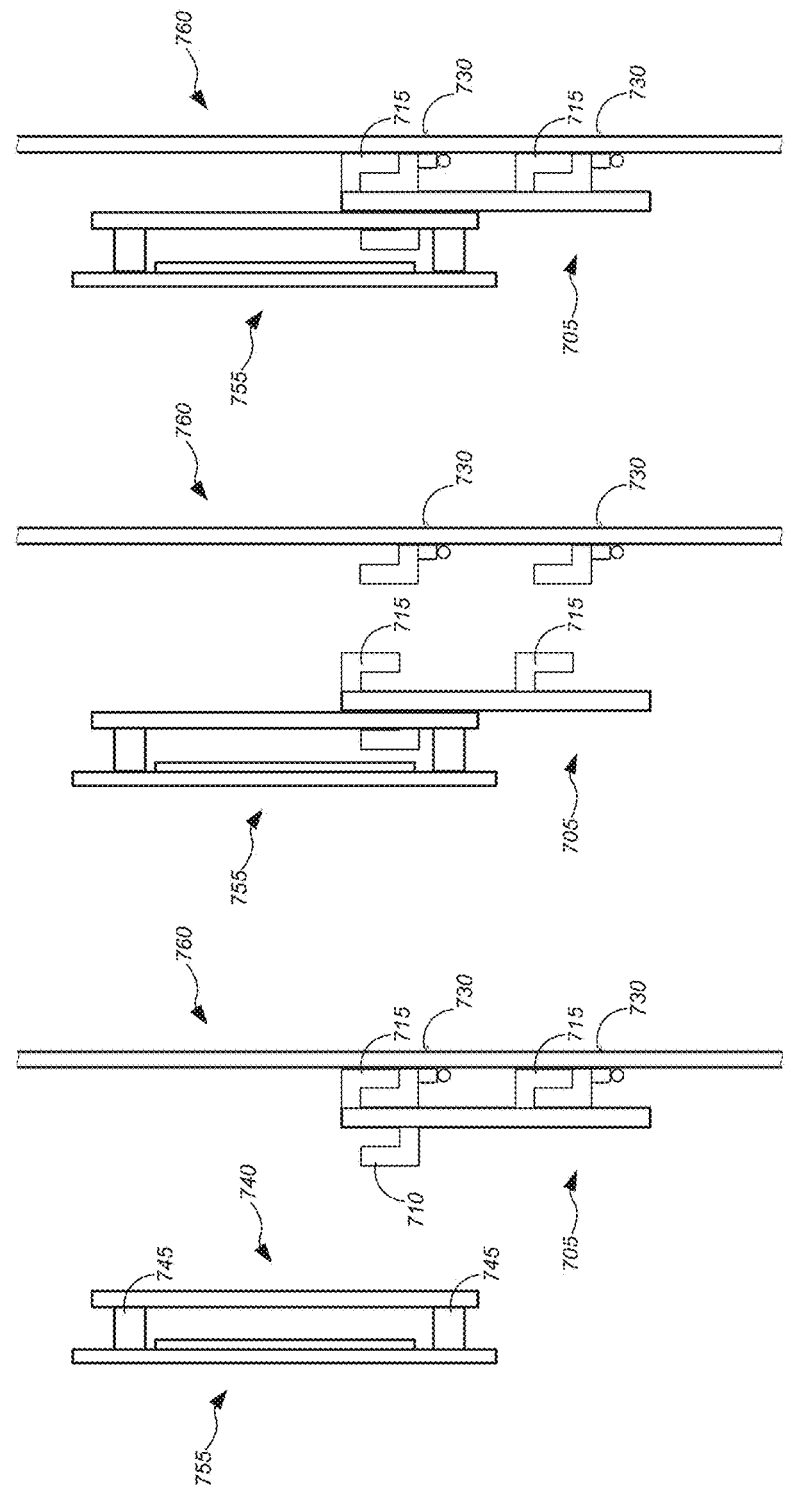

10,326,261 B1

ARCHITECTURAL WALL PANELS AND ADORNMENTS FOR CONCEALING INDOOR WIRING AND CABLES

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for concealing indoor wiring and cables, and, more particularly, to methods, systems, and apparatuses for concealing indoor wiring and cables while serving as architectural wall panels or adornments.

BACKGROUND

Home consumer electronics—such as televisions, media players, etc.—have become more and advanced, and a number of these devices now support wireless communications. Such devices, however, still require power cables to supply electrical power in order to operate. When these devices are mounted on a wall (in particular, televisions, wall speakers, or the like), these power cables may dangle against the wall, creating an unsightly and (usually) unorganized mess that detracts from the attractiveness of the underlying wall and/or the devices themselves.

Existing solutions to such cable tangles include wire conduits in the wall, wire-concealing baseboard raceways, wire-concealing moldings near the floor, wire-concealing moldings around doorways, wire-concealing moldings near the ceiling, cubicle-mounted wire management systems, or the like. As an initial matter, wire conduits are required to be installed before the insulation is installed and the dry wall is hung. Wire conduits can, at times, be difficult to feed wires through. If there are thicker cables and/or a greater number of cables that exceed the capacity of the existing wire conduits, holes must be made in the wall and insulation must be removed before another wire conduit(s) can be installed. Thereafter, the insulation must be replaced, and the wall must be repaired and painted (and in some cases, wall texture must be matched with that of surrounding portions of the wall). The other existing solutions listed above obviate the need to access the space behind the wall (and thus obviate any resultant wall repairs). However, such existing solutions have limitations. For example, wire-concealing baseboard raceways or wire-concealing moldings near the floor require routing cables near the baseboard (i.e., near the floor). For mounted televisions or other wall-mounted devices, that requires a long power cable or extension cables to reach the baseboard, which is unnecessary and does not conceal the wires against the middle portion of the wall. Likewise, wire-concealing moldings around doorways and wire-concealing moldings near the ceiling require unnecessary routing to portions of the wall that still fail to conceal the wires dangling in the middle of the wall. Cubicle-mounted wire management systems are applicable to cubicles, but not to indoor walls in residences or offices. Moreover, the existing systems require mounting structures that either do not allow for vertical channels to be formed in a middle of a wall or do not conceal the presence of wires or cables.

Hence, there is a need for more robust and scalable solutions for concealing indoor wiring and cables, and, more particularly, to methods, systems, and apparatuses for concealing indoor wiring and cables while serving as architectural wall panels or adornments.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIGS. 3A-3Y are schematic diagrams illustrating various embodiments of a system of architectural wall panels for concealing indoor wiring and cables.

FIGS. 6A-6P are schematic diagrams illustrating various other embodiments of an architectural wall panel system for concealing indoor wiring and cables.

FIGS. 7A-7K are schematic diagrams illustrating a system of a television mount that is used in conjunction with an architectural wall panel system for concealing indoor wiring and cables, in accordance with various embodiments.

DETAILED DESCRIPTION OF CERTAIN EMBODIMENTS

Overview

Figure 1:
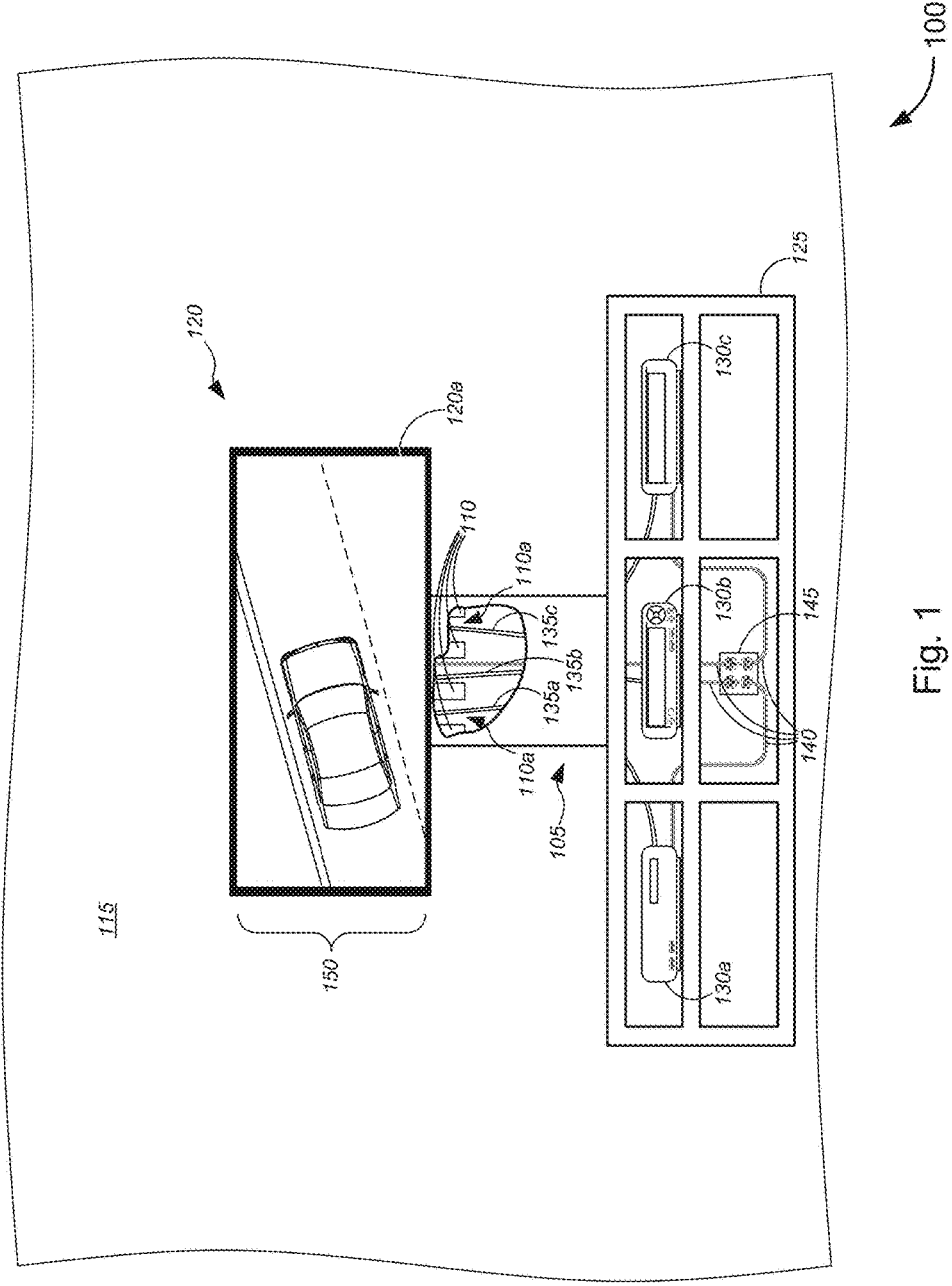
FIG. 1 is a schematic diagram illustrating a front elevation view of a system for concealing indoor wiring and cables while serving as architectural wall panels, in accordance with various embodiments.

Various embodiments provide tools and techniques for concealing indoor wiring and cables, and, more particularly, to methods, systems, and apparatuses for concealing indoor wiring and cables while serving as architectural wall panels or adornments.

In various embodiments, a system of architectural wall panels might include, without limitation, one or more architectural wall panels and a plurality of wall mounts that are removably securable to a wall. Each architectural wall panel might include, but is not limited to, a front face having a decorative or architectural pattern thereon, a rear face, and two or more mounting protrusions formed on a surface of the rear face. Each mounting protrusion and an adjacent mounting protrusion (together with the rear face and the wall on which the architectural wall panel is mounted) might form or define a vertical channel having a size through which one or more cables can be disposed when the architectural wall panel is mounted on the wall. The two or more mounting protrusions removably couple with two or more corresponding wall mounts that have been secured to the wall, thereby allowing the architectural wall panel to mount on the wall.

These and other functionalities of the system and device are described in detail below with respect to FIGS. 1-8. Unlike the existing wire-concealing solutions, such as those listed in the background, the various embodiments of the architectural wall panel system described herein utilize mounting components that serve both to provide wall mounting functionality, while (together with the rear face of the wall panel itself and the wall on which the wall panel is mounted) define vertical channels through which cables can be routed). Further the front face of the wall panel can be designed to fit (and in some cases, enhance) the aesthetic of the wall or room in which the consumer electronics may be mounted. Importantly, while serving to fit or enhance the aesthetics of the wall or room, the various embodiments of the architectural wall panels described herein, by the configurations of the mounting components, enable quick and easy mounting and removal of the wall panels, thereby providing quick access to the cables disposed and concealed behind the wall panels. The wall panels may also allow for ease of change in décor, as wall panels may be easily exchanged with other wall panels having different decorative or architectural patterns. For instance, for particular holidays or seasons, the day-to-day wall panels may be exchanged with wall panels having festive or seasonal designs. The home occupant or owner may also exchange wall panels based on mood or to accommodate (or impress guests). For example, when inviting one's employers or in-laws, one might replace the day-to-day wall panels with upscale-looking wall panels (e.g., tile-looking or tile-faced panels, stone-looking or stone-faced panels, ceramic-looking or ceramic-faced panels, frosted or clear glass-faced panels (with an under-layer that continues to conceal the wires), semi-transparent panels (with an under-layer that continues to conceal the wires), and/or the like). Such upscale-looking wall panels may also be used as day-to-day wall panels. The user might switch-up wall panels, or might combine wall panels in desired patterns, as appropriate or as desired. Other advantages of the various embodiments are also evident based on the description below.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

In an aspect, a system of architectural wall panels might comprise a plurality of wall mounts, each wall mount being removably securable to a wall; and one or more architectural wall panels. Each architectural wall panel might comprise a front face, the front face having one of a decorative pattern or architectural pattern thereon; a rear face; and two or more mounting protrusions. The two or more mounting protrusions might be formed on a surface of the rear face and might be spaced apart from adjacent mounting protrusions, each mounting protrusion and an adjacent mounting protrusion forming a vertical channel. Each vertical channel might have a size through which at least one cable can be disposed when the architectural wall panel is mounted on the wall. In some cases, the two or more mounting protrusions might removably couple with two or more corresponding wall mounts of the plurality of wall mounts that have been removably secured to the wall, thereby allowing the architectural wall panel to mount on the wall.

In some embodiments, at least a portion of each architectural wall panel might be made of a material comprising at least one of wood, polyurethane, fiberboard, plastic, metal, tile, ceramic, stone, vinyl, foam, fiberglass, or glass, and/or the like. In some instances, the front face of each architectural wall panel might comprise a portion that is at least one of opaque, transparent, semi-transparent, or frosted, and/or the like. In some cases, at least a portion of each architectural wall panel might be made of acoustic panel material that absorbs sound, or the like.

According to some embodiments, at least one architectural wall panel might further comprise one or more extendable interlocking devices, each extendable interlocking device being interlockable with a corresponding device mounted to an adjacent architectural wall panel. In some cases, the one or more extendable interlocking devices might be interlockable with one or more of at least one adjacent horizontal architectural wall panel or at least one adjacent vertical architectural wall panel. Alternatively, or additionally, two or more adjacent architectural wall panels might be interlockable with each other along at least one of a horizontal direction, a vertical direction, a diagonal direction, or a set of directions forming a geometric pattern, and/or the like.

In some embodiments, the two or more corresponding wall mounts might be connected with each other. The two or more corresponding wall mounts might comprise wall mountable attachments that allow the two or more corresponding wall mounts to mount to the wall. The wall mountable attachments might comprise at least one of double sided tape, removable tape, one or more pairs of hook and loop fasteners, one or more pairs of reclosable fasteners, one or more push fasteners, one or more screws, or wall mounting hardware, and/or the like. In some instances, the two or more corresponding wall mounts might further comprise a built-in spirit level. In some cases, each of the two or more corresponding wall mounts might further comprise at least one of a tab, a hook, an angled protrusion, a magnet, or a spring clamp, and/or the like. Each of the two or more mounting protrusions might comprise at least one of a hook, a tab, an angled protrusion, a magnet, or a rod or tube, and/or the like, respectively, corresponding to the at least one of the tab, the hook, the angled protrusion, the magnet, or the spring clamp of the two or more corresponding wall mounts, and/or the like.

According to some embodiments, at least one architectural wall panel might comprise openings on at least a portion of each of at least one of a top, a bottom, a left side, or a right side, and/or the like. The system might further comprise one or more external architectural wall panels. Each of at least one architectural wall panel might fit within each of one or more external architectural wall panels, the one or more external architectural wall panels covering each of one or more of the openings of the at least one architectural wall panel that fits within the one or more external architectural wall panels.

In some instances, at least one architectural wall panel might comprise a removable panel, the removable panel being removably attached to a portion of the front face of the at least one architectural wall panel. The portion of the front face might be an opening through which the at least one cable can be disposed. In some cases, the at least one cable might comprise at least one of one or more electrical wires, one or more electrical cables, one or more coaxial cables, one or more fiber optic cables, one or more non-fiber network cables, one or more telephone cables, or one or more power cables, and/or the like.

Merely by way of example, in some cases, at least one architectural wall panel might comprise two or more sets of cable ports and one or more sets of built-in cables each cable connecting two ports of a pair of the two or more sets of cable ports, each set of cable ports being disposed at one of a top side, a bottom side, a left side, or a right side of the at least one architectural wall panel. Each set of built-in connecting cables might comprise at least one of one or more electrical wires, one or more electrical cables, one or more coaxial cables, one or more fiber optic cables, one or more non-fiber network cables, one or more telephone cables, or one or more power cables, and/or the like. Each set of cable ports might comprise a set of ports corresponding to the at least one of one or more electrical wires, one or more electrical cables, one or more coaxial cables, one or more fiber optic cables, one or more non-fiber network cables, one or more telephone cables, or one or more power cables, and/or the like.

In another aspect, an architectural wall panel might comprise a front face, the front face having one of a decorative pattern or architectural pattern thereon; a rear face; and two or more mounting protrusions, the two or more mounting protrusions being formed on a surface of the rear face and being spaced apart from adjacent mounting protrusions, each mounting protrusion and an adjacent mounting protrusion forming a vertical channel. Each vertical channel might have a size through which at least one cable can be disposed when the architectural wall panel is mounted on a wall. The two or more mounting protrusions might removably couple with two or more corresponding wall mounts that are removably secured to the wall, thereby allowing the architectural wall panel to mount on the wall.

According to some embodiments, at least a portion of the architectural wall panel might be made of a material comprising at least one of wood, polyurethane, fiberboard, plastic, metal, tile, ceramic, stone, vinyl, foam, fiberglass, or glass, and/or the like. In some cases, the front face of the architectural wall panel might comprise a portion that is at least one of opaque, transparent, semi-transparent, or frosted, and/or the like. Alternatively, or additionally, at least a portion of the architectural wall panel might be made of acoustic panel material that absorbs sound, or the like. In some instances, each of the two or more mounting protrusions might comprise at least one of a hook, a tab, an angled protrusion, a magnet, or a rod or tube, and/or the like, respectively corresponding to the at least one of the tab, the hook, the angled protrusion, the magnet, or the spring clamp of each of the two or more corresponding wall mount, and/or the like.

In yet another aspect, a method might comprise removably securing a first set of two or more wall mounts of a plurality of wall mounts to a wall, the first set of two or more wall mounts being spaced apart to form one or more first vertical channels; disposing at least one cable within at least one of the one or more first vertical channels; and mounting a first architectural wall panel of a plurality of architectural wall panels on the first set of two or more wall mounts. The first architectural wall panel might comprise a front face, the front face having one of a decorative pattern or architectural pattern thereon; a rear face; and two or more mounting protrusions. The two or more mounting protrusions might be formed on a surface of the rear face and might be spaced apart from adjacent mounting protrusions, each mounting protrusion and an adjacent mounting protrusion forming one or more second vertical channels. Each second vertical channel might have a size through which the at least one cable is disposed when the architectural wall panel is mounted on the wall, the one or more second vertical channels aligning with the one or more first vertical channels. In some cases, mounting the architectural wall panel might comprise removably coupling the two or more mounting protrusions with the first set of two or more wall mounts that are removably secured to the wall.

In some embodiments, the method might further comprise removably securing other sets of two or more wall mounts of the plurality of wall mounts to the wall; reversibly interlocking two or more adjacent architectural wall panels of the plurality of architectural wall panels using two or more extendable interlocking devices; and mounting the interlocked two or more adjacent architectural wall panels on corresponding sets of the other sets of two or more wall mounts that are removably secured to the wall.

Alternatively, or additionally, in some instances, the method might further comprise removably securing one other set of two or more wall mounts of the plurality of wall mounts to the wall; placing a second architectural wall panel of the plurality of architectural wall panels within an external architectural wall panel, the external architectural wall panel covering any openings along at least one of a top, a bottom, a left side, or a right side of the second architectural wall panel; reversibly interlocking the second architectural wall panel to the external architectural wall panel; and mounting the interlocked second architectural wall panel and external architectural wall panel to the one other set of two or more wall mounts.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-8 illustrate some of the features of the method, system, and apparatus for concealing indoor wiring and cables, and, more particularly, to methods, systems, and apparatuses for concealing indoor wiring and cables while serving as architectural wall panels or adornments, as referred to above. The methods, systems, and apparatuses illustrated by FIGS. 1-8 refer to examples of different embodiments that include various components and steps, which can be considered alternatives or which can be used in conjunction with one another in the various embodiments. The description of the illustrated methods, systems, and apparatuses shown in FIGS. 1-8 is provided for purposes of illustration and should not be considered to limit the scope of the different embodiments.

With reference to the figures, FIG. 1 is a schematic diagram illustrating a front elevation view of a system 100 for concealing indoor wiring and cables while serving as architectural wall panels, in accordance with various embodiments.

In the non-limiting embodiment of FIG. 1, system 100 might comprise at least one architectural wall panel 105 (also referred to herein as "an architectural wall adornment," "a wall panel," "wall adornment," "wall art," "decorative wall panel," and/or the like). Each of the at least one architectural wall panel 105 might comprise a front face, a rear face, and two or more mounting protrusions. The front face might have one of a decorative pattern or architectural pattern thereon, while the rear face might face a wall (e.g., wall 115 as shown in FIG. 1) on which the particular architectural wall panel 105 might be mounted or hung, and the two or more mounting protrusion might be formed on a surface of the rear face. The two or more mounting protrusions (with four such protrusions being shown through the cut-out of architectural wall panel 105 of FIG. 1; although the various embodiments are not limited to two or four, and can be any suitable number of mounting protrusions equal to or greater than two) are spaced apart from adjacent mounting protrusions, each mounting protrusion and an adjacent mounting protrusion forming a vertical channel 110a. Each vertical channel 110a has a size through which at least one cable (e.g., cable 135a, 135b, 135c, etc.) can be disposed when the architectural wall panel 115 is mounted on the wall (e.g., wall 115 or the like). According to some embodiments, the at least one cable 135 might include, without limitation, at least one of one or more electrical wires, one or more electrical cables, one or more coaxial cables, one or more fiber optic cables, one or more non-fiber network cables, one or more telephone cables, or one or more power cables, and/or the like.

In some embodiments, at least a portion of each architectural wall panel 105 might be made of a material including, without limitation, at least one of wood, polyurethane, fiberboard, plastic, metal, tile, ceramic, stone, vinyl, foam, fiberglass, or glass, and/or the like. The front face of each architectural wall panel 105 might include, but is not limited to, a portion that is at least one of opaque, transparent, semi-transparent, or frosted, and/or the like. In some cases, at least a portion of each architectural wall panel 105 might be made of acoustic panel material that absorbs sound or the like.

The at least one architectural wall panel 105 may be used to conceal cables or wires from view, in some cases, without the need to create one or more holes through the wall on which the at least one architectural wall panel 105 may be mounted (e.g., wall 115 or the like) to feed the cables or wires through such holes and along the space(s) behind the wall. For houses that already have insulation installed within or behind the walls, feeding cables or wires through such insulation becomes problematic or difficult. Further complicating such rewiring are the presence of studs on which dry wall or other such materials are hung to form the wall. Feeding wires through studs requires drilling through the studs, which might affect the structural integrity of the wall (and thus of the building). Further, any such holes through the walls to access the space(s) behind the wall would require patching or re-patching, as well as painting (and matching the wall texture or the like). The use of the at least one architectural wall panel 105 obviates accessing the space(s) behind the walls, and thus avoids creating the hole(s) in the wall, much less repair such holes.

In some embodiments, the at least one architectural wall panel 105 may be used to conceal cables or wires leading to or from a television (e.g., television 120 or the like), which may be mounted on the wall (e.g., wall 115). For instance, as shown in FIG. 1, the at least one architectural wall panel 105 might be mounted on wall 115 between television 120 and an entertainment wall unit 125, both of which might also be mounted on wall 115. On one or more shelves of the entertainment wall unit 125 might be disposed one or more of a gaming console 130a, a digital video recording and playback device ("DVR") 130b, a set-top box ("STB") 130c, and/or the like. Audio and/or video cables 135a, 135b, and/or 135c (collectively, "cables 135" or the like) might connect each of the one or more of the gaming console 130a, the DVR 130b, and/or the STB 130c, respectively, to the television 120, each of the cables 135 being hidden behind the at least one architectural wall panel 105 and routed through one or more of the vertical channels 110a-that is, each of the cables 135 is routed through channel 110a, which is defined by a portion of the rear face of each of the at least one architectural wall panel 105, the wall 115, and two adjacent mounting protrusions 110 formed on the surface of the rear face of each architectural wall panel 105. Power cables 140 for each of the television 120 and the one or more of the gaming console 130a, the DVR 130b, and/or the STB 130c may be plugged into a wall outlet 145, thereby supplying each of these devices with electrical power. As further shown in FIG. 1, the power cable 140 for the television 120, which is depicted as being plugged into wall outlet 145, may also be routed through one of the vertical channels 110a (in this case, the same channel 110a as the cable 135b for the DVR 130b). With the cables 135 and the power cables 140 connected as described above, media content 150 (e.g., video content, image content, and/or gaming content) may be displayed on the screen 120a of the television 120. In this non-limiting example, a car on a highway is displayed on the screen 120a, and can be from a game, a movie, or a television program, as obtained via one or more of the gaming console 130a, the DVR 130b, and/or the STB 130c, or the like.

Although FIG. 1 depicts the cables 135 being routed through separate vertical channels 110a, the various embodiments are not so limited, and two or more of the cables 135 may be routed through one of the vertical channel 110a. In FIG. 1, the power cables 140 (and the wall outlet 145) as well as the cables 135 are shown as being visible behind the frame of the entertainment wall unit 125 merely for illustration purposes. In practice, if the entertainment wall unit 125 does not have a back panel to hide the various cables and wires (and the wall outlet), other architectural wall panels 105 of appropriate size and shape may be used between the portions of the frame of the entertainment wall unit 125 or used between the entertainment wall unit 125 and the wall 115 to further conceal or hide the cables 135 (and the wall outlet 145) as well as the power cables 140 from view.

Figure 2:
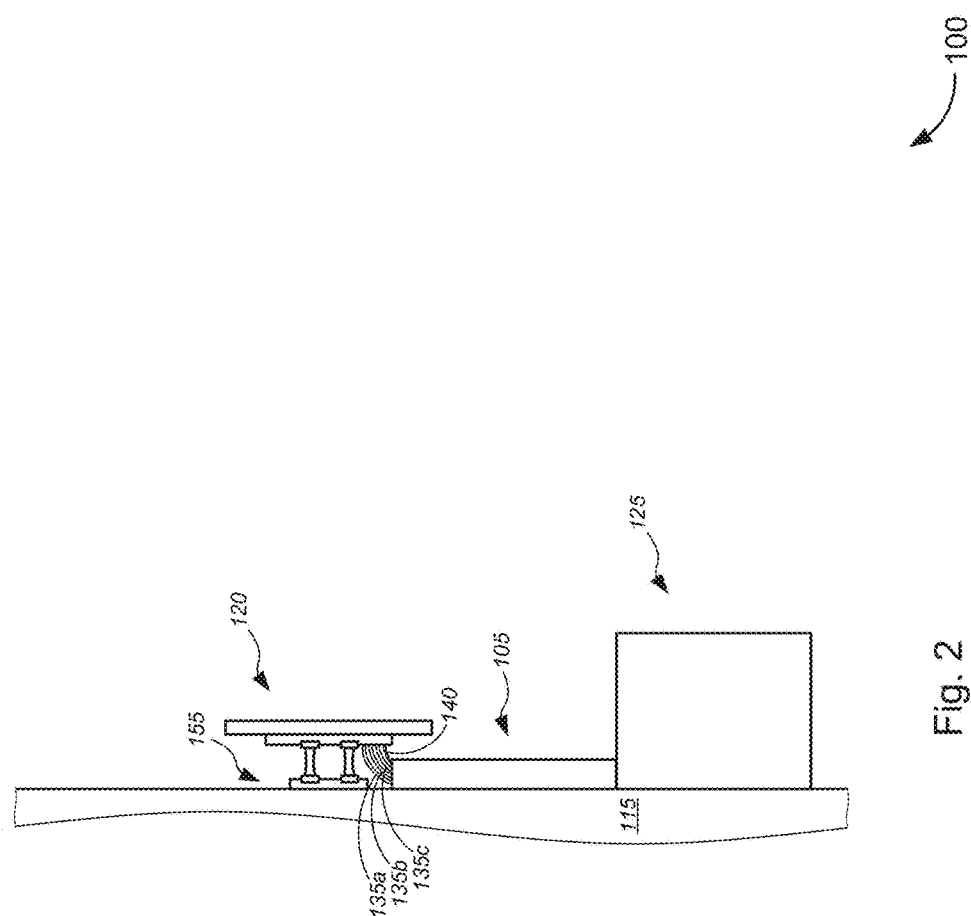
FIG. 2 is a schematic diagram illustrating a side elevation view of the system of FIG. 1 for concealing indoor wiring and cables while serving as architectural wall panels.

FIG. 2 is a schematic diagram illustrating a side elevation view of the system 100 of FIG. 1 for concealing indoor wiring and cables while serving as architectural wall panels.

In the non-limiting embodiment of FIG. 2, the at least one architectural wall panel 105 is depicted as being mounted to wall 115. Also shown mounted to wall 115 is the entertainment wall unit 125. Television 120 is illustrated as being mounted to wall 115 via TV wall mount 155. As illustrated in FIG. 2, cables 135a, 135b, and 135c, along with power cable 140, respectively from the gaming console 130a, the DVR 130b, and the STB 130c, and from wall outlet 145, are shown extending from the top opening of the at least one architectural wall panel 105 to connect with the television 120 (via appropriate ports on the rear panel of the television 120, not shown).

Various embodiments of the system of architectural wall panels are shown and described below with reference to FIGS. 3-6.

FIGS. 3A-3Y (collectively, "FIG. 3") are schematic diagrams illustrating various embodiments 300, 300', 300", 300''', and 300'''' of a system of architectural wall panels for concealing indoor wiring and cables.

In the non-limiting embodiment 300 of FIGS. 3A-3E, system 300 might comprise architectural wall panel 305 and a plurality of wall mounts 320. The architectural wall panel 305 might comprise a front face 305a, a rear face 305c, and two or more mounting protrusions 310. As shown in FIG. 3A, the front face 305a might have one of a decorative pattern or architectural pattern 305b thereon. As shown in FIG. 3B, the two or more mounting protrusions 310 might be formed on a surface of the rear face 305c and might be spaced apart from adjacent mounting protrusions 310, each mounting protrusion 310 and an adjacent mounting protrusion 310 forming a vertical channel 310a. Each vertical channel 310a has a size through which at least one cable (e.g., cable 135a, 135b, and/or 135c as shown in FIGS. 1 and 2) can be disposed when the architectural wall panel 305 is mounted on a wall (e.g., wall 115 as shown in FIGS. 1 and 2). In some cases, system 300 might further comprise one or more spacers 315, each of which might have a depth that is similar if not identical to the depth of each of the two or more mounting protrusions 310 (as shown in FIG. 3D), so that the architectural wall panel 305 can be made parallel with the wall (e.g., wall 115 as shown in FIGS. 1 and 2, or the like) on which the architectural wall panel 305 may be mounted. Alternatively, although not shown, spacers 315 might have a depth that is different from the depth of the mounting protrusions 310, so that the architectural wall panel 305 might be mounted such that the front face 305a of the architectural wall panel 305 is angled with respect to the wall (e.g., wall 115 as shown in FIGS. 1 and 2, or the like) on which the architectural wall panel 305 may be mounted.

FIG. 3C depicts the plurality of wall mounts 320, each wall mount 320 corresponding to each mounting protrusion 310 of the architectural wall panel 305. As shown in the non-limited embodiment 300 of FIG. 3C, the plurality of wall mounts 320 might be connected with each other via wall mountable attachment 325, which may be mounted to the wall (e.g., wall 115 as shown in FIGS. 1 and 2, or the like) via screws, bolts, or other fasteners 330. In some embodiments, the plurality of wall mounts 320 and/or the wall mountable attachment 325 might comprise a built-in spirit level or the like 335, which allows a user to ensure that the plurality of wall mounts 320 are level to a flat ground surface when mounted on the wall.

FIG. 3D, which depicts a side elevation view of the architectural wall panel 305 as shown along the A-A direction as shown in FIG. 3B, shows mounting protrusions 310 as an angled hook formed from the rear surface 305c of the at least one architectural wall panel 305. FIG. 3E, which depicts a side elevation view of the wall mounts 320 as shown along the B-B direction as shown in FIG. 3C, shows the wall mounts 320 connected to the wall mountable attachment 325, which may be mounted to the wall via fasteners 330. FIG. 3E also depicts the optional built-in spirit level 335. As further shown in FIG. 3E, the wall mounts 320 are depicted as having an angled profile that complements or corresponds to the angled hook of the mounting protrusions 310.

When in use, the wall mounts 320 may be mounted to the wall via the wall mountable attachment 325 and fasteners 330 (and made level via the optional built-in spirit level 335 or via an external spirit level or other leveler). Cables or wires (e.g., cables 135a-135c and power cables 140 as shown in FIGS. 1 and 2, or the like) may be disposed within at least one of the vertical channels 310a. Thereafter, the architectural wall panel 305 may be mounted on the mounted wall mounts 320 via mounting protrusions 310, thereby concealing or hiding the cables or wires.

In the non-limiting embodiment 300' of FIGS. 3F-3J, system 300' might comprise architectural wall panel 305' and a plurality of wall mounts 320'. The architectural wall panel 305' might comprise a front face 305a, a rear face 305c, and two or more mounting protrusions 310'. As shown in FIG. 3F, the front face 305a might have one of a decorative pattern or architectural pattern 305b thereon. As shown in FIG. 3G, the two or more mounting protrusions 310' might be formed on a surface of the rear face 305c and might be spaced apart from adjacent mounting protrusions 310', each mounting protrusion 310' and an adjacent mounting protrusion 310' forming a vertical channel 310a. Each vertical channel 310a has a size through which at least one cable (e.g., cable 135a, 135b, and/or 135c as shown in FIGS. 1 and 2) can be disposed when the architectural wall panel 305' is mounted on a wall (e.g., wall 115 as shown in FIGS. 1 and 2). In some cases, system 300' might further comprise one or more spacers 315', each of which might have a depth that is similar if not identical to the depth of each of the two or more mounting protrusions 310' (as shown in FIG. 3I), so that the architectural wall panel 305' can be made parallel with the wall (e.g., wall 115 as shown in FIGS. 1 and 2, or the like) on which the architectural wall panel 305' may be mounted. Alternatively, although not shown, spacers 315' might have a depth that is different from the depth of the mounting protrusions 310', so that the architectural wall panel 305' might be mounted such that the front face 305a of the architectural wall panel 305' is angled with respect to the wall (e.g., wall 115 as shown in FIGS. 1 and 2, or the like) on which the architectural wall panel 305' may be mounted.

FIG. 3H depicts the plurality of wall mounts 320', each wall mount 320' corresponding to each mounting protrusion 310' of the architectural wall panel 305'. As shown in the non-limited embodiment 300' of FIG. 3H, the plurality of wall mounts 320' might be connected with each other via wall mountable attachment 325', which may be mounted to the wall (e.g., wall 115 as shown in FIGS. 1 and 2, or the like) via at least one of a set of double sided tape, a set of removable tape, a set of one or more pairs of hook and loop fasteners, a set of one or more pairs of reclosable fasteners, a set of one or more push fasteners, or a set of other fasteners 330'. In some embodiments, the plurality of wall mounts 320' and/or the wall mountable attachment 325' might comprise a built-in spirit level or the like 335, which allows a user to ensure that the plurality of wall mounts 320' are level to a flat ground surface when mounted on the wall.

FIG. 3I, which depicts a side elevation view of the architectural wall panel 305' as shown along the C-C direction as shown in FIG. 3G, shows mounting protrusions 310' as an L-shaped hook formed from the rear surface 305c of the at least one architectural wall panel 305'. FIG. 3J, which depicts a side elevation view of the wall mounts 320' as shown along the D-D direction as shown in FIG. 3H, shows the wall mounts 320' connected to the wall mountable attachment 325', which may be mounted to the wall via fasteners 330'. FIG. 3J also depicts the optional built-in spirit level 335. As further shown in FIG. 3J, the wall mounts 320' are depicted as having an L-shaped profile that complements or corresponds to the L-shaped hook of the mounting protrusions 310'.

When in use, the wall mounts 320' may be mounted to the wall via the wall mountable attachment 325' and fasteners 330' (and made level via the optional built-in spirit level 335 or via an external spirit level or other leveler). Cables or wires (e.g., cables 135a-135c and power cables 140 as shown in FIGS. 1 and 2, or the like) may be disposed within at least one of the vertical channels 310a. Thereafter, the architectural wall panel 305' may be mounted on the mounted wall mounts 320' via mounting protrusions 310', thereby concealing or hiding the cables or wires.

In the non-limiting embodiment 300" of FIGS. 3K-3O, system 300" might comprise architectural wall panel 305" and a plurality of wall mounts 320". The architectural wall panel 305" might comprise a front face 305a, a rear face 305c, and two or more mounting protrusions 310". As shown in FIG. 3K, the front face 305a might have one of a decorative pattern or architectural pattern 305b thereon. As shown in FIG. 3L, the two or more mounting protrusions 310" might be formed on a surface of the rear face 305c and might be spaced apart from adjacent mounting protrusions 310", each mounting protrusion 310" and an adjacent mounting protrusion 310" forming a vertical channel 310a. Each vertical channel 310a has a size through which at least one cable (e.g., cable 135a, 135b, and/or 135c as shown in FIGS. 1 and 2) can be disposed when the architectural wall panel 305" is mounted on a wall (e.g., wall 115 as shown in FIGS. 1 and 2). In some cases, system 300" might further comprise one or more spacers 315", each of which might have a depth that is similar if not identical to the depth of each of the two or more mounting protrusions 310" (as shown in FIG. 3N), so that the architectural wall panel 305" can be made parallel with the wall (e.g., wall 115 as shown in FIGS. 1 and 2, or the like) on which the architectural wall panel 305" may be mounted. Alternatively, although not shown, spacers 315" might have a depth that is different from the depth of the mounting protrusions 310", so that the architectural wall panel 305" might be mounted such that the front face 305a of the architectural wall panel 305" is angled with respect to the wall (e.g., wall 115 as shown in FIGS. 1 and 2, or the like) on which the architectural wall panel 305" may be mounted.

FIG. 3M depicts the plurality of wall mounts 320", each wall mount 320" corresponding to each mounting protrusion 310" of the architectural wall panel 305". As shown in the non-limited embodiment 300" of FIG. 3M, the plurality of wall mounts 320" might be connected with each other via wall mountable attachment 325", which may be mounted to the wall (e.g., wall 115 as shown in FIGS. 1 and 2, or the like) via screws, bolts, or other fasteners 330. In some embodiments, the plurality of wall mounts 320" and/or the wall mountable attachment 325" might comprise a built-in spirit level or the like 335, which allows a user to ensure that the plurality of wall mounts 320" are level to a flat ground surface when mounted on the wall.

FIG. 3N, which depicts a side elevation view of the architectural wall panel 305" as shown along the E-E direction as shown in FIG. 3L, shows each mounting protrusion 310" as a block formed from the rear surface 305c of the at least one architectural wall panel 305", each block having a magnetic element 340 embedded therein. FIG. 3O, which depicts a side elevation view of the wall mounts 320" as shown along the F-F direction as shown in FIG. 3M, shows the wall mounts 320" connected to the wall mountable attachment 325", which may be mounted to the wall via fasteners 330. FIG. 3O also depicts the optional built-in spirit level 335. As further shown in FIG. 3O, the wall mounts 320" are depicted as having a block profile that complements or corresponds to the block of the mounting protrusions 310". The wall mounts 320" might have corresponding or complementary magnetic elements 340 embedded therein that would magnetically couple with the magnetic elements embedded in the mounting protrusions 310" when the blocks of the mounting protrusions 310" rest on the blocks of the wall mounts 320" during mounting.

When in use, the wall mounts 320" may be mounted to the wall via the wall mountable attachment 325" and fasteners 330 (and made level via the optional built-in spirit level 335 or via an external spirit level or other leveler). Cables or wires (e.g., cables 135a-135c and power cables 140 as shown in FIGS. 1 and 2, or the like) may be disposed within at least one of the vertical channels 310a. Thereafter, the architectural wall panel 305" may be mounted on the mounted wall mounts 320" via mounting protrusions 310"— with the mounting protrusions 310" disposed atop the wall mounts 320", with the magnetic elements 340 of one magnetically coupling with the magnetic elements 340 of the other —, thereby concealing or hiding the cables or wires.

In the non-limiting embodiment 300''' of FIGS. 3P-3T, system 300''' might comprise architectural wall panel 305''' and a plurality of wall mounts 320'''. The architectural wall panel 305''' might comprise a front face 305a, a rear face 305c, and two or more mounting protrusions 310'''. As shown in FIG. 3P, the front face 305a might have one of a decorative pattern or architectural pattern 305b thereon. As shown in FIG. 3Q, the two or more mounting protrusions 310''' might be formed on a surface of the rear face 305c and might be spaced apart from adjacent mounting protrusions 310''', each mounting protrusion 310''' and an adjacent mounting protrusion 310''' forming a vertical channel 310a. As shown in FIGS. 3Q and 3S, the mounting protrusions 310''' might each comprise a rod, a tube, or a ring 345, or the like, each made of a material including, but not limited to, metal, plastic, or the like. Each vertical channel 310a has a size through which at least one cable (e.g., cable 135a, 135b, and/or 135c as shown in FIGS. 1 and 2) can be disposed when the architectural wall panel 305''' is mounted on a wall (e.g., wall 115 as shown in FIGS. 1 and 2). In some cases, system 300''' might further comprise one or more spacers 315''', each of which might have a depth that is similar if not identical to the depth of each of the two or more mounting protrusions 310'''(as shown in FIG. 3S) coupled with the wall mounts 320''' (as shown in FIG. 3T), so that the architectural wall panel 305''' can be made parallel with the wall (e.g., wall 115 as shown in FIGS. 1 and 2, or the like) on which the architectural wall panel 305''' may be mounted. Alternatively, although not shown, spacers 315''' might have a depth that is different from the depth of the mounting protrusions 310''' coupled with the wall mounts 320''', so that the architectural wall panel 305''' might be mounted such that the front face 305a of the architectural wall panel 305''' is angled with respect to the wall (e.g., wall 115 as shown in FIGS. 1 and 2, or the like) on which the architectural wall panel 305''' may be mounted.

FIG. 3R depicts the plurality of wall mounts 320''', each wall mount 320''' corresponding to each mounting protrusion 310''' of the architectural wall panel 305'''. As shown in the non-limited embodiment 300''' of FIG. 3R, the plurality of wall mounts 320''' might be connected with each other via wall mountable attachment 325''', which may be mounted to the wall (e.g., wall 115 as shown in FIGS. 1 and 2, or the like) via screws, bolts, or other fasteners 330. In some embodiments, the plurality of wall mounts 320''' and/or the wall mountable attachment 325''' might comprise a built-in spirit level or the like 335, which allows a user to ensure that the plurality of wall mounts 320''' are level to a flat ground surface when mounted on the wall. As shown in FIGS. 3R and 3T, the wall mounts 320''' might each comprise a spring clamp 350, or the like, each made of a material including, but not limited to, metal, plastic, or the like.

FIG. 3S, which depicts a side elevation view of the architectural wall panel 305''' as shown along the G-G direction as shown in FIG. 3Q, shows mounting protrusions 310''' as the rod, tube, or ring 345 formed from the rear surface 305c of the at least one architectural wall panel 305'''. FIG. 3T, which depicts a side elevation view of the wall mounts 320''' as shown along the H-H direction as shown in FIG. 3R, shows the wall mounts 320''' connected to the wall mountable attachment 325''', which may be mounted to the wall via fasteners 330. FIG. 3T also depicts the optional built-in spirit level 335. As further shown in FIG. 3T, the wall mounts 320''' are depicted as having the spring clamp 350 that can be coupled to the rod, tube, or ring 345 of the mounting protrusions 310'''.

When in use, the wall mounts 320''' may be mounted to the wall via the wall mountable attachment 325''' and fasteners 330 (and made level via the optional built-in spirit level 335 or via an external spirit level or other leveler). Cables or wires (e.g., cables 135a-135c and power cables 140 as shown in FIGS. 1 and 2, or the like) may be disposed within at least one of the vertical channels 310a. Thereafter, the architectural wall panel 305''' may be mounted on the mounted wall mounts 320''' via mounting protrusions 310'''—with the rod, tube, or ring 345 of the mounting protrusions 310''' removably coupling with spring clamp 350 of the wall mounts 320'''—, thereby concealing or hiding the cables or wires.

In the non-limiting embodiment 300'''' of FIGS. 3U-3Y, system 300'''' might comprise architectural wall panel 305'''' and a plurality of wall mounts 360. The architectural wall panel 305'''' might comprise a front face 305a, a rear face 305c, and two or more mounting protrusions 310''''. As shown in FIG. 3U, the front face 305a might have one of a decorative pattern or architectural pattern 305b thereon. As shown in FIG. 3V, the two or more mounting protrusions 310'''' might be formed on a surface of the rear face 305c and might be spaced apart from adjacent mounting protrusions 310'''', each mounting protrusion 310'''' and an adjacent mounting protrusion 310'''' forming a vertical channel 310a. One or more magnetic elements or metal strips 355 may be disposed on or within at least a portion of the rear surface of the mounting protrusion 310''''. Each vertical channel 310a has a size through which at least one cable (e.g., cable 135a, 135b, and/or 135c as shown in FIGS. 1 and 2) can be disposed when the architectural wall panel 305'''' is mounted on a wall (e.g., wall 115 as shown in FIGS. 1 and 2). In some cases, each mounting protrusion 310'''' might extend from a top portion to a bottom portion of the architectural wall panel 305''''. In some instances, the mounting protrusions 310'''' might have a height that is similar or identical to the height of the architectural wall panel 305''''. Each of the mounting protrusions 310'''', according to some embodiments, might have a uniform depth (as shown in FIG. 3X), so that the architectural wall panel 305'''' can be made parallel with the wall (e.g., wall 115 as shown in FIGS. 1 and 2, or the like) on which the architectural wall panel 305'''' may be mounted. Alternatively, although not shown, each of the mounting protrusions 310'''' might have a different (or sloping depth) from the top portion to the bottom portion, so that the architectural wall panel 305'''' might be mounted such that the front face 305a of the architectural wall panel 305'''' is angled with respect to the wall (e.g., wall 115 as shown in FIGS. 1 and 2, or the like) on which the architectural wall panel 305'''' may be mounted.

FIG. 3W depicts the plurality of wall mounts 360, each wall mount 360 corresponding to each mounting protrusion 310'''' of the architectural wall panel 305''''. As shown in the non-limited embodiment 300'''' of FIG. 3W, the plurality of wall mounts 360 might include, without limitation, one of a metal strip, a magnetic strip, and/or the like. The plurality of wall mounts 360 may be mounted to the wall (e.g., wall 115 as shown in FIGS. 1 and 2, or the like) via screws, bolts, or other fasteners 330.

FIG. 3X, which depicts a side elevation view of the architectural wall panel 305'''' as shown along the I-I direction as shown in FIG. 3V, shows mounting protrusions 310'''' as an extended block formed from the rear surface 305c of the at least one architectural wall panel 305''''. FIG. 3Y, which depicts a side elevation view of the wall mounts 360 as shown along the J-J direction as shown in FIG. 3W, shows the wall mounts 360, which may be mounted to the wall via fasteners 330.

When in use, the wall mounts 360 may be mounted to the wall via the fasteners 330. Cables or wires (e.g., cables 135a-135c and power cables 140 as shown in FIGS. 1 and 2, or the like) may be disposed within at least one of the vertical channels 310a. Thereafter, the architectural wall panel 305'''' may be mounted on the mounted wall mounts 360 via the magnetic elements or metal strips 355 magnetically coupling with the corresponding one of the metal strip, the magnetic strip, and/or the like, of the plurality of wall mounts 360, thereby concealing or hiding the cables or wires.

Although specific configurations and combinations of elements are shown in embodiments 300, 300', 300'', 300''', and 300'''' of FIG. 3, the various embodiments are not so limited, and the elements may be interchanged in any suitable combination of configurations and arrangements. The embodiments 300, 300', 300'', 300''', or 300'''' of FIGS. 3A-3Y might otherwise be similar, if not identical, to embodiment 100 of FIGS. 1 and 2, or the like, and the description of components of embodiment 100 of FIGS. 1 and 2 might be applicable to the corresponding components of embodiments 300, 300', 300'', 300''', or 300''''.

Figure 4A:
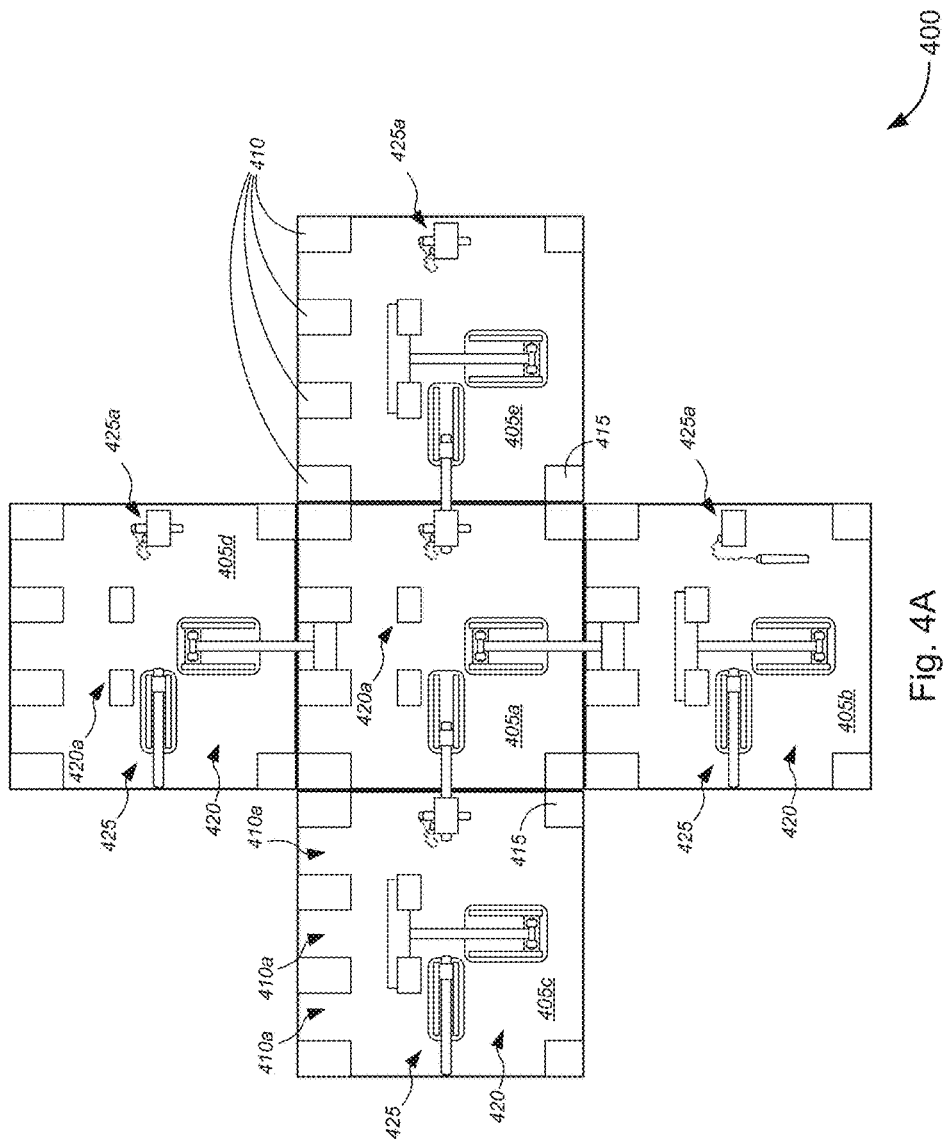
FIGS. 4A and 4B are schematic diagrams illustrating various embodiments of a system comprising a plurality of interlocking architectural wall panels for concealing indoor wiring and cables.
Figure 4B:
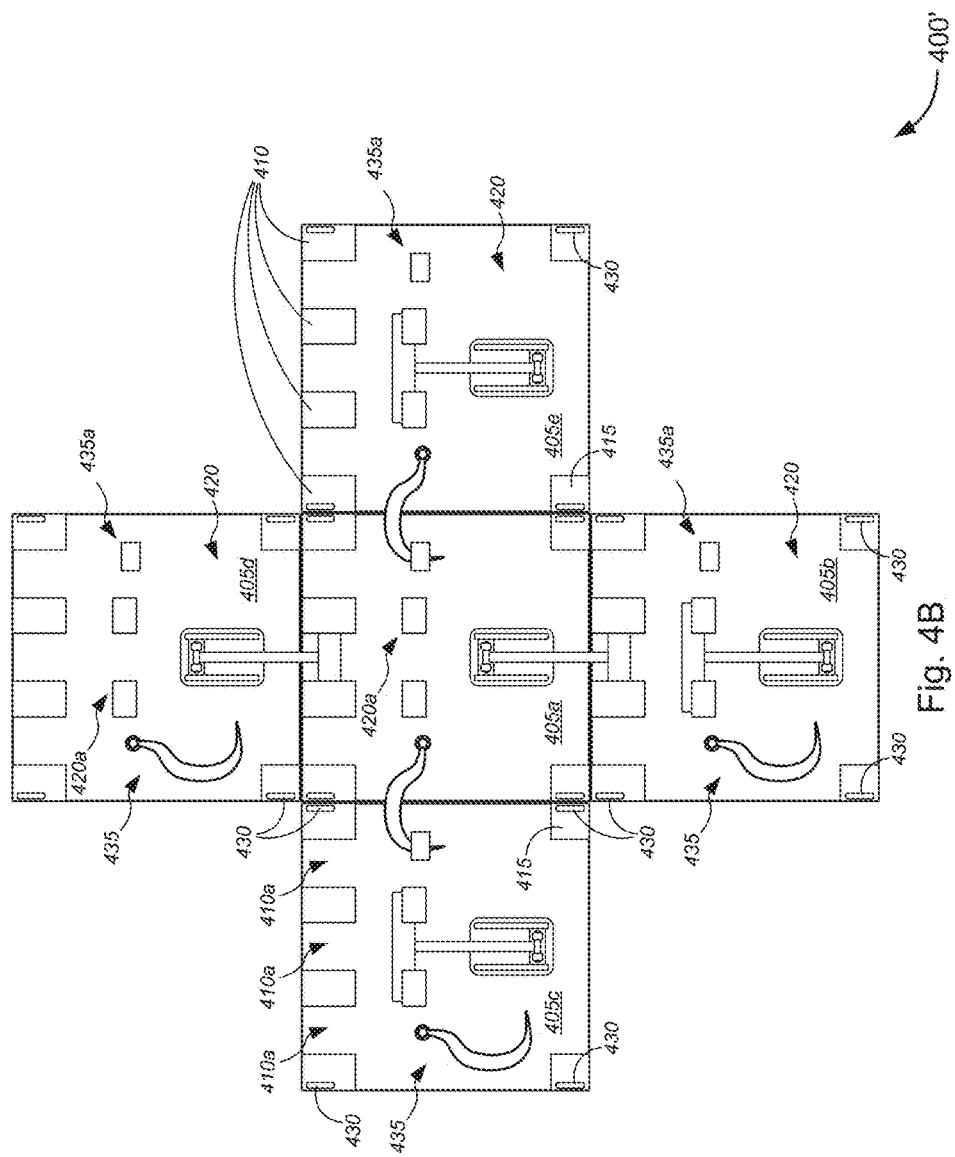

FIGS. 4A and 4B (collectively, "FIG. 4") are schematic diagrams illustrating various embodiments 400 and 400' of a system comprising a plurality of interlocking architectural wall panels for concealing indoor wiring and cables.

In the non-limiting embodiment 400 of the system of FIG. 4A, a plurality of architectural wall panels 405a-405e (collectively, "architectural wall panels 405" or the like) might be interlocked together. Each architectural wall panel 405 might comprise a rear face, two or more mounting protrusions 410, one or more spacers 415 (which might correspond to spacers 315 as shown in FIG. 3), at least one first extendable interlocking device 420, and at least one second extendable interlocking device 425, and/or the like. In some cases, the at least one first extendable interlocking device 420 might interconnect or interlock with one or more of the mounting protrusions 410 on an adjacent architectural wall panel 405. In some instances, the at least one second extendable interlocking device 425 might interconnect or interlock with latches 425a on an adjacent architectural wall panel 405. As shown, e.g., in FIG. 4A, the at least one first extendable interlocking device 420 of the first architectural wall panel 405a might interconnect or interlock with one or more of the mounting protrusions 410 of the second architectural wall panel 405b. As also shown in FIG. 4A, the at least one second extendable interlocking device 425 of the first architectural wall panel 405a might interconnect or interlock with latch 425a of the third architectural wall panel 405c. Similarly, as shown in FIG. 4A, the at least one first extendable interlocking device 420 of the fourth architectural wall panel 405d might interconnect or interlock with one or more of the mounting protrusions 410 of the first architectural wall panel 405a. As further shown in FIG. 4A, the at least one second extendable interlocking device 425 of the fifth architectural wall panel 405e might interconnect or interlock with latch 425a of the first architectural wall panel 405a.

The mounting protrusion 410 and an adjacent mounting protrusion 410 might form a vertical channel 410a. Each vertical channel 410a might have a size through which at least one cable (e.g., cables 135a-135c and power cables 140 as shown in FIGS. 1 and 2, or the like) can be disposed when the architectural wall panel 405 is mounted on the wall (e.g., wall 115 as shown in FIGS. 1 and 2, or the like).

In the non-limiting embodiment of FIG. 4A, each of the at least one first extendable interlocking device 420 might comprise a first base plate mounted to the rear face. The first base plate might comprise rails or the like along which a first slide plate might move. The rails or the like might allow the first slide plate to shift along a first direction or a second direction opposite to the first direction. Each first extendable interlocking device 420 might further comprise a shaft and a hook plate extending from a first end of the shaft. The second end of the shaft might be attached to a rotatable mount on the first slide plate. When not in use, the first slide plate might be shifted along the rail to shift the hook plate onto hooks 420a that are mounted on the rear face the architectural wall panel 405. When in use, the first slide plate might be shifted along the rail to shift the hook plate off the hooks 420a, then the shaft might be rotated about the rotatable mount on the first slide plate while the first slide plate is moved in the opposite direction along the rail to be closer to an adjacent architectural wall panel 405, and the shaft might continue to be rotated until the hook plate extends beyond one or more mounting protrusions 410 of the adjacent architectural wall panel 405. Thereafter, the first slide plate is moved in the first direction until the hook plate is engaged with the one or more mounting protrusions 410 of the adjacent architectural wall panel 405. The first slide plate might further comprise locking devices that lock the first slide plate in place when the hook plate is either engaged with hooks 420a or engaged with the one or more mounting protrusions 410 of the adjacent architectural wall panel 405.

As further shown in the non-limiting embodiment of FIG. 4A, each of the at least one second extendable interlocking device 425 might comprise a second base plate mounted to the rear face. The second base plate might comprise rails or the like along which a second slide plate might move. The rails or the like might allow the second slide plate to shift along a third direction or a fourth direction opposite to the third direction, the third and fourth directions being perpendicular to the first and second directions. Each second extendable interlocking device 425 might further comprise a bolt with a first end, a second end, and a through-hole near the first end, with the second end being attached to the second slide plate. When not in use, the second slide plate might be set at one end of the rails, such that the bolt is retracted within the perimeter of the architectural wall panel. When in use, the second slide plate might be shifted along the rail along the third direction to slide within a hole in a receiving block 425a. To lock the bolt in place within the receiving block 425a, a locking bolt (which might be chained to the receiving block 425a) might slide within a perpendicular through-hole in the receiving block 425a and through the through-hole near the first end of the bolt.

With reference to non-limiting embodiment 400' of FIG. 4B, rather than the at least one second extendable interlocking device 425 of embodiment 400 of FIG. 4A, magnetic elements 430 in at least the side end pieces of the two or more mounting protrusions 410 and/or in at least the side end pieces of the one or more spaces 415 might allow sideways adjacent architectural wall panels 405. To lock the adjacent architectural wall panels 405, at least one third interlocking device 435 might comprise a hook that can be engaged with a receiving block 435a mounted to an adjacent architectural wall panel 405. As shown in FIG. 4B, first architectural wall panel 405a might interconnect or interlock with third architectural wall panel 405c by first magnetically coupling the first and third architectural wall panels 405a and 405c via magnetic elements 430, and then locked using the hook rotated about a rotatable base mounted to the rear face of the first architectural wall panel 405a to engage with the receiving block 435a mounted to the rear face of the third architectural wall panel 405c.

Embodiment 400' of FIG. 4B might otherwise be similar to embodiment 400 of FIG. 4A, and might function to interlock with adjacent architectural wall panels and to conceal cables disposed along the vertical channel(s) 410a. The embodiment 400 or 400' might otherwise be similar, if not identical, to any of embodiments 100, 300, 300', 300", 300'", or 300"" of FIGS. 1 and 3A-3Y, or the like, and the description of components of embodiment 100, 300, 300', 300", 300'", and/or 300"" might be applicable to the corresponding components of embodiment 400 or 400'

Figure 5A:
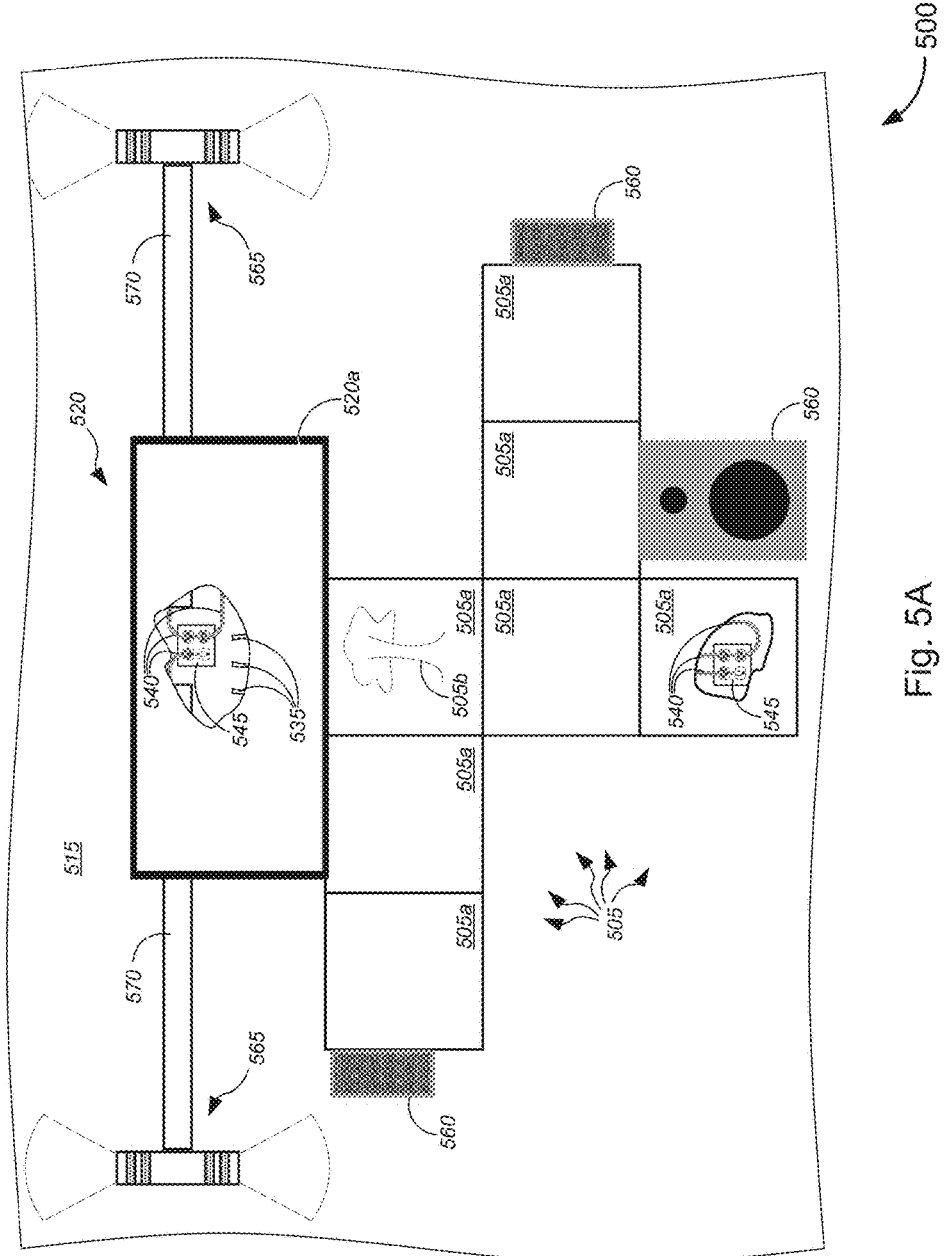
FIGS. 5A and 5B are schematic diagrams illustrating a front elevation view of various other embodiments of a system for concealing indoor wiring and cables while serving as architectural wall panels.
Figure 5B:
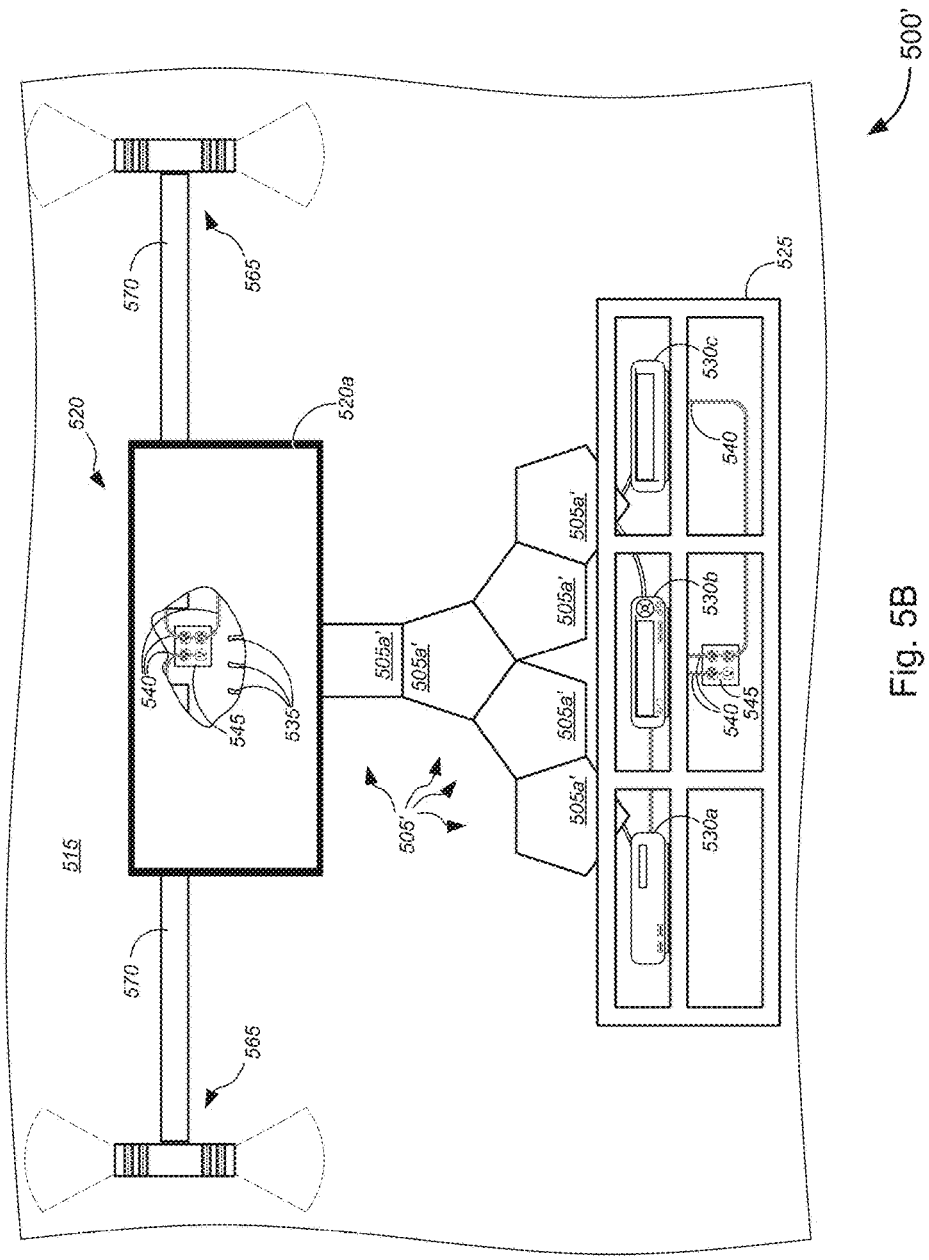

FIGS. 5A and 5B (collectively, "FIG. 5") are schematic diagrams illustrating a front elevation view of various other embodiments 500 and 500' of a system for concealing indoor wiring and cables while serving as architectural wall panels.

In the non-limiting embodiment 500 of FIG. 5A, a plurality of architectural wall panels 505 might be releasably interconnected or interlocked with adjacent architectural wall panels 505 along horizontal and vertical directions (e.g., as shown in FIG. 4, or the like) and mounted on wall 515. Each architectural wall panel 505—which might be rectangular or square in shape—might comprise a front face 505a, on which might be disposed one of a decorative pattern or architectural pattern 505b thereon. Each architectural wall panel 505 might further comprise a rear face (which might correspond to rear face 305c as shown in FIG. 3, or the like). As shown in FIG. 5A, embodiment 500 might further comprise television 520, which is also mounted on wall 515. One or more cables 535 might be disposed along vertical channels (e.g., channels 110a, 310a, or 410a, respectively, of FIGS. 1, 3, and 4, or the like) (not shown in FIG. 5) and along horizontal channels (not shown), connecting the television 520 to each of one or more speakers or audio playback devices 560. The one or more cables 535 are shown in part through the cut-out in the display screen 520a of television 520. Power cables 540 might connect with wall outlet 545 (as shown through the cut-out in one of the architectural wall panels 505), might be disposed through vertical and horizontal channels of the architectural wall panels 505, and might electrically power each of the one or more speakers or audio playback devices 560. One or more lighting devices 565, which may be mounted on wall 515, might electrically couple to an upper wall outlet 545 via power cables 540 to power the one or more lighting devices 565, as shown through the cut-out in the display screen 520a of television 520. The embodiment 500 might further comprise other architectural wall panels 570 mounted on the wall 515 between the lighting devices 565 and the television 520. The other architectural wall panels 570 might be shaped as a horizontally extended wall panel 570, with mounting protrusions similar to the mounting protrusions of the architectural wall panels 105, 305, 405, and 505 of FIGS. 1, 3, 4, and 5A, respectively. In addition, the other architectural wall panels 570 might further comprise side channels through which the power cables 540 might be disposed between the upper wall outlet 545 and the lighting devices 565.

With reference to FIG. 5B, embodiment 500' might comprise a plurality of architectural wall panels 505', which might be releasably interconnected or interlocked with adjacent architectural wall panels 505' along horizontal, vertical, and/or diagonal directions and mounted on wall 515. Each architectural wall panel 505' might comprise a front face 505a', on which might be disposed one of a decorative pattern or architectural pattern (e.g., pattern 505b of FIG. 5A, or the like) thereon. According to some embodiments, each architectural wall panel 505' might have a shape including, but not limited to, a rectangle, a square, a pentagon, a hexagon, or other polygon, or the like. Each architectural wall panel 505' might further comprise a rear face (which might correspond to rear face 305c as shown in FIG. 3, or the like). As shown in FIG. 5B, embodiment 500' might further comprise television 520, which is also mounted on wall 515. One or more cables 535 might be disposed along vertical channels (e.g., channels 110a, 310a, or 410a, respectively, of FIGS. 1, 3, and 4, or the like) (not shown in FIG. 5), along horizontal channels (not shown), and/or along diagonal channels (also not shown), connecting the television 520 to each of one or more of a gaming console 530a, a digital video recording and playback device ("DVR") 530b, a set-top box ("STB") 530c, and/or the like that are disposed on shelves of an entertainment wall unit 525 that is mounted on wall 515. The one or more cables 535 are shown in part through the cut-out in the display screen 520a of television 520. Power cables 540 might connect with wall outlet 545 (as shown through one of the lower shelves of the entertainment wall unit 525), and might electrically power each of the one or more of a gaming console 530a, a digital video recording and playback device ("DVR") 530b, a set-top box ("STB") 530c, and/or the like. One or more lighting devices 565, which may be mounted on wall 515, might electrically couple to an upper wall outlet 545 via power cables 540 to power the one or more lighting devices 565, as shown through the cut-out in the display screen 520a of television 520. The embodiment 500' might further comprise other architectural wall panels 570 mounted on the wall 515 between the lighting devices 565 and the television 520. The other architectural wall panels 570 might be shaped as a horizontally extended wall panel 570, with mounting protrusions similar to the mounting protrusions of the architectural wall panels 105, 305, 405, and 505' of FIGS. 1, 3, 4, and 5A, respectively. In addition, the other architectural wall panels 570 might further comprise side channels through which the power cables 540 might be disposed between the upper wall outlet 545 and the lighting devices 565.

In the various embodiments, two or more adjacent architectural wall panels may be interlockable with each other along at least one of a horizontal direction, a vertical direction, a diagonal direction, or a set of directions forming a geometric pattern, and/or the like. The embodiment 500 or 500' might otherwise be similar, if not identical, to any of embodiments 100, 300, 300', 300'', 300''', or 300'''' of FIGS. 1 and 3A-3Y, or the like, and the description of components of embodiment 100, 300, 300', 300'', 300''', and/or 300'''' might be applicable to the corresponding components of embodiment 500 or 500'.

FIGS. 6A-6P (collectively, "FIG. 6") are schematic diagrams illustrating various embodiments 600, 600', and 600'' of an architectural wall panel system for concealing indoor wiring and cables.

In the non-limiting embodiment 600 of FIGS. 6A-6E, an architectural wall panel 605 might have a front face 605a, which might have one of a decorative pattern or architectural pattern 605b thereon (as shown, e.g., in FIG. 6A). An external architectural wall panel 620 might likewise have a front face 620a, which might have one of a decorative pattern or architectural pattern 620b thereon (as shown, e.g., in FIG. 6B). With reference to FIG. 6C, the architectural wall panel 605 might have a rear face 605c, on which might be mounted two or more mounting protrusions 610, one or more spacers 615, and one or more interlocking devices 630. The two or more mounting protrusions 610 might be spaced apart from adjacent mounting protrusions 610, each mounting protrusion 610 and an adjacent mounting protrusion 610 forming a vertical channel 610a. Each vertical channel 610a might have a size through which at least one cable (e.g., cables 135, 140, 535, or 540 of FIG. 1 or 5, and/or the like) can be disposed when the architectural wall panel is mounted on the wall (e.g., wall 115 or 515 of FIG. 1, 2, or 5, or the like). The external architectural wall panel 620 might have a rear face 620c, on which might be mounted or affixed (or on which might be formed) blocks 625 around one or more edges of the external architectural wall panel 620.

In the non-limiting example of FIG. 6D, the blocks 625 might have gaps that, together with the rear face 620c and the wall on which the external architectural wall panel 620 may be mounted (not shown), would define channels 625a and 625b (which are depicted in FIG. 6D as vertical channels; although similar channels may be formed along the sides through block 625 disposed along the side edges of the external architectural wall panel 620 (not shown)). The architectural wall panel 605 may be fitted within the space defined by the blocks 625 (as shown, e.g., in FIG. 6E), or the like, of the external architectural wall panel 620. Once fitted within the external architectural wall panel 620, the architectural wall panel 605 may be releasably secured, affixed, or attached to the external architectural wall panel 620 via the one or more interlocking devices 630 (which are depicted in FIG. 6 as being embodied by a slide barrel bolt latch, or the like, but is not limited to such type of latch and can be embodied by any suitable latch).

As shown in FIG. 6C, in a first state, the barrel bolt may be slid back and locked with the barrel being disposed within the perimeter of the architectural wall panel 605. In the second state, as shown in FIG. 6E, the barrel bolt may be slid and locked with the barrel being disposed beyond the perimeter of the architectural wall panel 605 to seat within receiving slots 635 disposed within portions of the blocks 625 when the architectural wall panel 605 is fitted within the external architectural wall panel 620. In some embodiments, when so fitted, channels 610a might align with one or more of each of the channels 625a and/or 625b. In the non-limiting example of FIG. 6E, the aligned channels define vertical channels through which cables may be disposed. The various embodiments, however, are not so limited, and the channels may align to provide any suitable direction through which cables may be disposed (e.g., from one side to the other side, from top to one side, from top to bottom, from top to both sides, from top to one side and the bottom, from top to both sides and the bottom, and so on). Also, when so fitted, any openings along at least one of the top, bottom, and/or one or more sides of the architectural wall panel 605 (i.e., as shown in the non-limiting example of FIGS. 6C and 6E as being the left and right sides) may be covered by the portions of the side blocks 625.

With reference to the non-limiting embodiment 600' of FIGS. 6F-6K, an architectural wall panel 640, having a front surface 640a, might have a removable panel 645 (as shown, e.g., in FIG. 6H) disposed in an opening 640b (as shown, e.g., in FIG. 6G) in a portion of the front surface 640a (as shown, e.g., in FIG. 6F). The removable panel 645 might similarly have a front surface 645a (as shown, e.g., in FIGS. 6F and 6H), which is depicted in FIG. 6F as being inset within hole 640b of architectural wall panel 640. In some cases, the front surface 645a might be aligned with (i.e., might lie within the same plane as) front surface 640a (not specifically shown). The architectural wall panel 640 might have a rear face 640c on which might be mounted two or more mounting protrusions 650 and one or more spacers 655. The two or more mounting protrusions 650 might be spaced apart from adjacent mounting protrusions 650, each mounting protrusion 650 and an adjacent mounting protrusion 650 forming a vertical channel 650a. Each vertical channel 650a might have a size through which at least one cable (e.g., cables 135, 140, 535, or 540 of FIG. 1 or 5, and/or the like) can be disposed when the architectural wall panel 640 is mounted on the wall (e.g., wall 115 or 515 of FIG. 1, 2, or 5, or the like). As shown in FIG. 6J, the architectural wall panel 640 might have hole 640b disposed in a portion of the rear surface 640c. When the removable panel 645 is disposed in the hole 640b (as shown, e.g., in FIG. 6I), the rear surface 645b of the removable panel 645 might be aligned with (i.e., might lie within the same plane as) rear surface 640c (not specifically shown). According to some embodiments, the opening 640b allows at least one cable to be disposed therethrough. When the at least one cable is not being disposed (or fed) through the opening 640b, the opening 640b may be covered with removable panel 645. In some cases, removable panel 645 might comprise at least one of one or more lighting devices, one or more speakers, or one or more display devices, and/or the like mounted thereon and connectable to cables concealed by the architectural wall panel 640.

The embodiment 600 or 600' might otherwise be similar, if not identical, to any of embodiments 300, 300', 300", 300''', or 300'''' of FIGS. 3A-3Y, or the like, and the description of components of embodiment 300, 300', 300", 300''', or 300'''' might be applicable to the corresponding components of embodiment 600 or 600'.

Turning to the non-limiting embodiment 600" of FIGS. 6L-6P, architectural wall panel 660 might comprise a plurality of patterned holes 665 (which may be of any suitable size, shape, and/or orientation or pattern, or the like) disposed through a front face 660a of the architectural wall panel 660. Colored or patterned sheet 670 might be inserted through slot 685 (as shown, e.g., in FIG. 6O) that is disposed along a side portion of the architectural wall panel 660. When inserted, the colored or patterned sheet 670 may be seen through the patterned holes 665. FIG. 6L depicts the colored or patterned sheet 670 being partially inserted through slot 685, so that the colored or patterned sheet 670 may be seen through only some of the patterned holes 665.

As shown in FIG. 6N, two or more mounting protrusions 675 may be formed on a surface of the rear face 660b and may be spaced apart from adjacent mounting protrusions 675, each mounting protrusion 675 and an adjacent mounting protrusion 675 forming a vertical channel 675a. One or more magnetic elements or metal strips 680 may be disposed on or within at least a portion of the rear surface of the mounting protrusion 675. Each vertical channel 675a has a size through which at least one cable (e.g., cable 135a, 135b, and/or 135c as shown in FIGS. 1 and 2) can be disposed when the architectural wall panel 660 is mounted on a wall (e.g., wall 115 as shown in FIGS. 1 and 2). In some cases, each mounting protrusion 675 might extend from a top portion to a bottom portion of the architectural wall panel 660. In some instances, the mounting protrusions 675 might have a height that is similar or identical to the height of the architectural wall panel 660. Each of the mounting protrusions 675, according to some embodiments, might have a uniform depth (as shown in FIG. 6O), so that the architectural wall panel 660 can be made parallel with the wall (e.g., wall 115 as shown in FIGS. 1 and 2, or the like) on which the architectural wall panel 660 may be mounted. Alternatively, although not shown, each of the mounting protrusions 675 might have a different (or sloping depth) from the top portion to the bottom portion, so that the architectural wall panel 660 might be mounted such that the front face 660a of the architectural wall panel 660 is angled with respect to the wall (e.g., wall 115 as shown in FIGS. 1 and 2, or the like) on which the architectural wall panel 660 may be mounted.

A plurality of wall mounts 690 may be mounted on the wall, with each wall mount 690 corresponding to each mounting protrusion 675 of the architectural wall panel 660. As shown in the non-limited embodiment 600", the plurality of wall mounts 690 might include, without limitation, one of a metal strip, a magnetic strip, and/or the like. The plurality of wall mounts 690 may be mounted to the wall (e.g., wall 115 as shown in FIGS. 1 and 2, or the like) via screws, bolts, or other fasteners 695.

FIG. 6O, which depicts a side elevation view of the architectural wall panel 660 as shown along the K-K direction as shown in FIG. 6N, shows mounting protrusions 675 as an extended block formed from the rear surface 660b of the at least one architectural wall panel 660. FIG. 6P, which depicts a side elevation view of the wall mounts 690, shows the wall mounts 690, which may be mounted to the wall via fasteners 695. The embodiment 600" might otherwise be similar, if not identical, to embodiment 300"" of FIGS. 3U-3Y, or the like, and the description of components of embodiment 300"" might be applicable to the corresponding components of embodiment 600".

Although not specifically shown in the figures, at least one architectural wall panel might include two or more sets of cable ports and one or more sets of built-in cables each cable connecting two ports of a pair of the two or more sets of cable ports, each set of cable ports being disposed at one of a top side, a bottom side, a left side, or a right side of the at least one architectural wall panel. Each set of built-in connecting cables might include, but is not limited to, at least one of one or more electrical wires, one or more electrical cables, one or more coaxial cables, one or more fiber optic cables, one or more non-fiber network cables, one or more telephone cables, or one or more power cables, and/or the like. Each set of cable ports might include, without limitation, a set of ports corresponding to the at least one of one or more electrical wires, one or more electrical cables, one or more coaxial cables, one or more fiber optic cables, one or more non-fiber network cables, one or more telephone cables, or one or more power cables, and/or the like.

FIGS. 7A-7K (collectively, "FIG. 7") are schematic diagrams illustrating a system 700 of a television mount that is used in conjunction with an TV mounting wall panel system for concealing indoor wiring and cables, in accordance with various embodiments.

In the non-limiting embodiment of FIG. 7, system 700 might comprise TV mounting wall panel 705 and a plurality of wall mounts 720. The TV mounting wall panel 705 might comprise a front face 705*a*, a rear face 705*b*, a cable slot(s) 705*c*, two or more TV mounting protrusions 710, and two or more mounting protrusions 715. As shown in FIG. 7A, the front face 705*a* might have the two or more TV mounting protrusions 710 formed thereon. As shown in FIG. 7B, the two or more mounting protrusions 715 might be formed on a surface of the rear face 705*b* and might be spaced apart from adjacent mounting protrusions 715, each mounting protrusion 715 and an adjacent mounting protrusion 715 forming a vertical channel 715*a*. Each vertical channel 715*a* has a size through which at least one cable (e.g., cable 135*a*, 135*b*, and/or 135*c* as shown in FIGS. 1 and 2) can be disposed when the TV mounting wall panel 705 is mounted on a wall (e.g., wall 115 as shown in FIGS. 1 and 2).

FIG. 7C depicts the plurality of wall mounts 720, each wall mount 720 corresponding to each mounting protrusion 715 of the TV mounting wall panel 705. As shown in the non-limited embodiment 700 of FIG. 7C, the plurality of wall mounts 720 might be connected with each other via wall mountable attachment 725, which may be mounted to the wall (e.g., wall 115 as shown in FIGS. 1 and 2, or the like) via screws, bolts, or other fasteners 730. According to some embodiments, two sets of the plurality of wall mounts 720 might be used to mount the architectural wall mount 705. In some embodiments, the plurality of wall mounts 720 and/or the wall mountable attachment 725 might comprise a built-in spirit level or the like 735, which allows a user to ensure that the plurality of wall mounts 720 are level to a flat ground surface when mounted on the wall.

FIG. 7D, which depicts a side elevation view of the TV mounting wall panel 705 as shown along the L-L direction as shown in FIG. 7B, shows mounting protrusions 715 as an L-shaped hook formed from the rear surface 705*b* of the at least one TV mounting wall panel 705. FIG. 7E, which depicts a side elevation view of the wall mounts 720 as shown along the M-M direction as shown in FIG. 7C, shows the wall mounts 720 connected to the wall mountable attachment 725, which may be mounted to the wall via fasteners 730. FIG. 7E also depicts the optional built-in spirit level 735. As further shown in FIG. 7E, the wall mounts 720 are depicted as having an L-shaped profile that complements or corresponds to the L-shaped hook of the mounting protrusions 715.

When in use, the wall mounts 720 may be mounted to the wall via the wall mountable attachment 725 and fasteners 730 (and made level via the optional built-in spirit level 735 or via an external spirit level or other leveler). Cables or wires (e.g., cables 175*a*-175*c* and power cables 140 as shown in FIGS. 1 and 2, or the like) may be disposed within at least one of the vertical channels 715*a*. Thereafter, the TV mounting wall panel 705 may be mounted on the mounted wall mounts 720 via mounting protrusions 715, thereby concealing or hiding the cables or wires.

With reference to FIGS. 7F-7H, a universal TV mount 740 might comprise TV attachment devices 745 (which might include, without limitation, magnets, screws, bolts, etc.) and one or more slots 750. As shown in FIGS. 7F-7H, the universal TV mount 740 might mount onto TV mounting wall panel 705 via the two or more TV mounting protrusions 710 of the TV mounting wall panel 705 and the one or more slots 750 of the universal TV mount 740.

Turning to FIGS. 7I-7K, a television 755 might be removably affixed to the universal TV mount 740 via the TV attachment devices 745. With reference to FIG. 7I, the TV mounting wall panel 705 might be removably attached to the wall mounts 720 that are mounted on the wall 760 via fasteners 730. The television 755, which has been removably affixed to the universal TV mount 740, might be removably attached to the TV mounting wall panel 705 via the two or more TV mounting protrusions 710. Alternatively, with reference to FIG. 7J, the television 755, which has been removably affixed to the universal TV mount 740, might be removably attached to the TV mounting wall panel 705 via the two or more TV mounting protrusions 710. The television 755, which has been removably affixed to the universal TV mount 740 and has been removably attached to the TV mounting wall panel 705 via the two or more TV mounting protrusions 710, might be removably attached to the wall mounts 720 (which has been mounted on the wall 760 via fasteners 730). FIG. 7K depicts the television 755 mounted to the wall 760 via the wall mounts 720, the TV mounting wall panel 705, and the universal TV mount 740. Cables (e.g., cables 135 of FIGS. 1 and 2, or the like) may be routed through the one or more slots 750 and through cable slot(s) 705*c* to communicatively couple the television 755 with media players (e.g., devices 135*a*-135*c* of FIG. 1, or the like), and to connect the television 755 with a wall outlet via a power cable (e.g., power cable 140 of FIG. 1, or the like). Although the TV mounting system is depicted in FIG. 7 as having a specific set of configurations and components, the various embodiments are not so limited, and the TV mounting system can have any suitable configuration and/or components consistent with the various embodiments as described herein.

Figure 8:
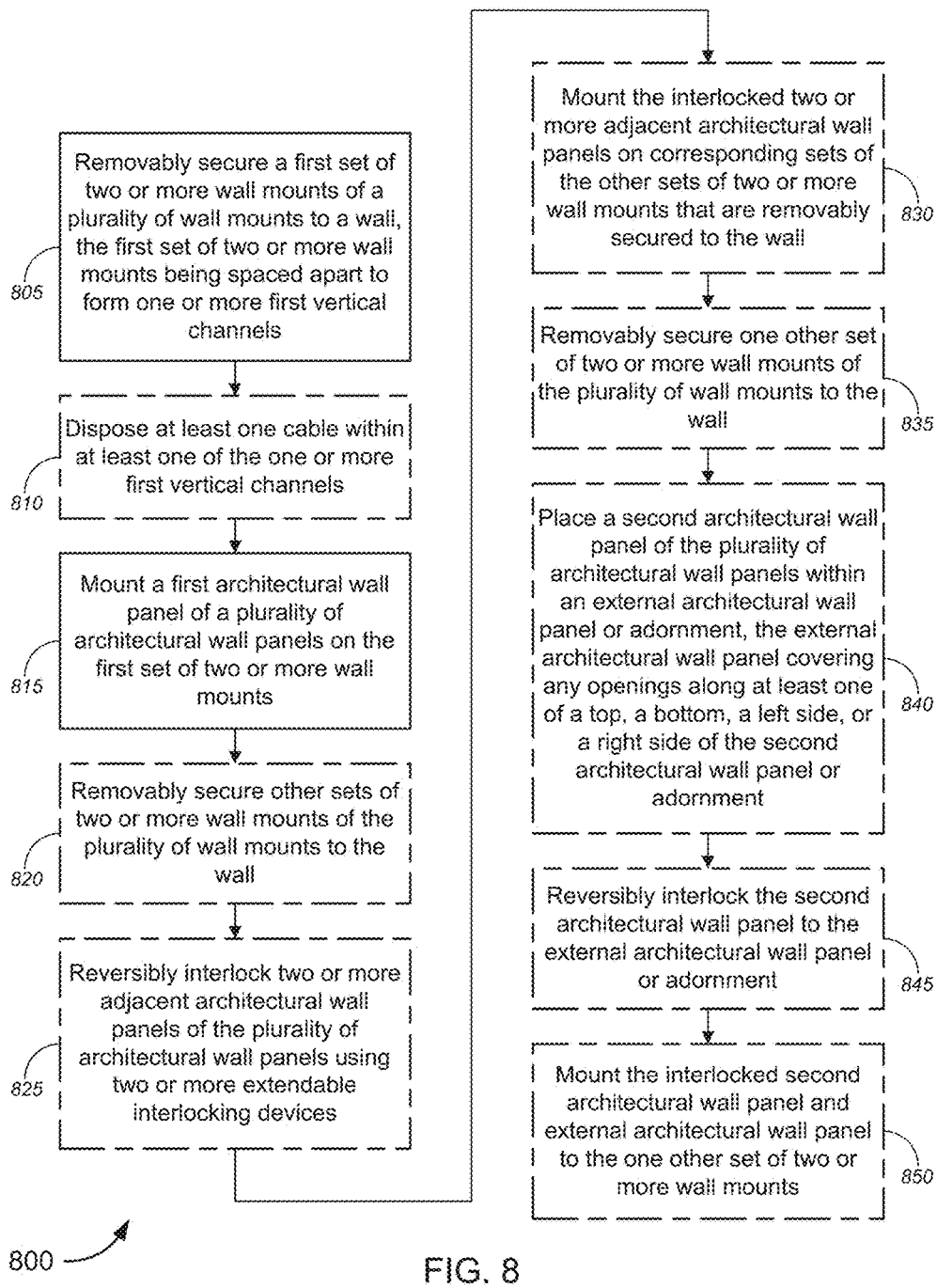
FIG. 8 is a flow diagram illustrating a method for concealing indoor wiring and cables while serving as architectural wall panels, in accordance with various embodiments.

FIG. 8 is a flow diagram illustrating a method 800 for concealing indoor wiring and cables while serving as architectural wall panels, in accordance with various embodiments.

While the techniques and procedures are depicted and/or described in a certain order for purposes of illustration, it should be appreciated that certain procedures may be reordered and/or omitted within the scope of various embodiments. Moreover, while the method 800 illustrated by FIG.

8 can be implemented by or with (and, in some cases, are described below with respect to) the systems or embodiments 100, 300, 300', 300", 300''', 300'''', 400, 400', 500, 500', 600, and 700 of FIGS. 1-7 (or components thereof), such methods may also be implemented using any suitable hardware (or software) implementation. Similarly, while each of the systems or embodiments 100, 300, 300', 300", 300''', 300'''', 400, 400', 500, 500', 600, and 700 of FIGS. 1-7 (or components thereof), can operate according to the method 800 illustrated by FIG. 8 (e.g., by executing instructions embodied on a computer readable medium), the systems or embodiments 100, 300, 300', 300", 300''', 300'''', 400, 400', 500, 500', 600, and 700 of FIGS. 1-7 can each also operate according to other modes of operation and/or perform other suitable procedures.

In the non-limiting embodiment of FIG. 8, method 800, at block 805, might comprise removably securing a first set of two or more wall mounts of a plurality of wall mounts to a wall, the first set of two or more wall mounts being spaced apart to form one or more first vertical channels. At optional block 810, method 800 might comprise disposing at least one cable within at least one of the one or more first vertical channels. Method 800 might further comprise mounting a first architectural wall panel of a plurality of architectural wall panels on the first set of two or more wall mounts (block 815). The first architectural wall panel might comprise a front face, the front face having one of a decorative pattern or architectural pattern thereon; a rear face; and two or more mounting protrusions. The two or more mounting protrusions might be formed on a surface of the rear face and might be spaced apart from adjacent mounting protrusions, each mounting protrusion and an adjacent mounting protrusion forming one or more second vertical channels. Each second vertical channel might have a size through which the at least one cable is disposed when the architectural wall panel is mounted on the wall, the one or more second vertical channels aligning with the one or more first vertical channels. In some cases, mounting the architectural wall panel might comprise removably coupling the two or more mounting protrusions with the first set of two or more wall mounts that are removably secured to the wall.

In some embodiments, method 800 might further comprise removably securing other sets of two or more wall mounts of the plurality of wall mounts to the wall (optional block 820); reversibly interlocking two or more adjacent architectural wall panels of the plurality of architectural wall panels using two or more extendable interlocking devices (optional block 825); and mounting the interlocked two or more adjacent architectural wall panels on corresponding sets of the other sets of two or more wall mounts that are removably secured to the wall (optional block 830).

According to some embodiments, method 800 might further comprise removably securing one other set of two or more wall mounts of the plurality of wall mounts to the wall (optional block 835); placing a second architectural wall panel of the plurality of architectural wall panels within an external architectural wall panel, the external architectural wall panel covering any openings along at least one of a top, a bottom, a left side, or a right side of the second architectural wall panel (optional block 840); reversibly interlocking the second architectural wall panel to the external architectural wall panel (optional block 845); and mounting the interlocked second architectural wall panel and external architectural wall panel to the one other set of two or more wall mounts (optional block 850).

Merely by way of example, in some cases, at least a portion of each architectural wall panel might be made of a material including, without limitation, at least one of wood, polyurethane, fiberboard, plastic, metal, tile, ceramic, stone, vinyl, foam, fiberglass, or glass, and/or the like. According to some embodiments, the front face of each architectural wall panel might include, but is not limited to, a portion that is at least one of opaque, transparent, semi-transparent, or frosted, and/or the like. In some instances, at least a portion of each architectural wall panel might be made of acoustic panel material or the like that absorbs sound.

In some embodiments, at least one architectural wall panel might further include, without limitation, one or more extendable interlocking devices, each extendable interlocking device being interlockable with a corresponding device mounted to an adjacent architectural wall panel. In some cases, the one or more extendable interlocking devices might be interlockable with one or more of at least one adjacent horizontal architectural wall panel or at least one adjacent vertical architectural wall panel. In some instances, two or more adjacent horizontal architectural wall panels might be interlockable with each other along at least one of a horizontal direction, a vertical direction, a diagonal direction, or a set of directions forming a geometric pattern, and/or the like.

According to some embodiments, the two or more corresponding wall mounts might be connected with each other. The two or more corresponding wall mounts might comprise wall mountable attachments that allow the two or more corresponding wall mounts to mount to the wall. The wall mountable attachments might include, but are not limited to, at least one of double sided tape, removable tape, one or more pairs of hook and loop fasteners, one or more pairs of reclosable fasteners, one or more push fasteners, one or more screws, or wall mounting hardware, and/or the like. In some instances, the two or more corresponding wall mounts might further include a built-in spirit level. In some cases, each of the two or more corresponding wall mounts might further include, without limitation, at least one of a tab, a hook, an angled protrusion, a magnet, or a spring clamp, and/or the like. Each of the two or more mounting protrusions might include, but is not limited to, at least one of a hook, a tab, an angled protrusion, a magnet, or a rod or tube, and/or the like, respectively corresponding to the at least one of the tab, the hook, the angled protrusion, the magnet, or the spring clamp, and/or the like of the two or more corresponding wall mounts.

In some embodiments, at least one architectural wall panel might comprise openings on at least a portion of each of at least one of a top, a bottom, a left side, or a right side, and/or the like. The system might further comprise one or more external architectural wall panels, each of at least one architectural wall panel might fit within each of one or more external architectural wall panels, the one or more external architectural wall panels might cover each of one or more of the openings of the at least one architectural wall panel that fits within the one or more external architectural wall panels.

In some cases, at least one architectural wall panel might comprise a removable panel, the removable panel being removably attached to a portion of the front face of the at least one architectural wall panel. The portion of the front face might be an opening through which the at least one cable can be disposed. In some instances, the at least one cable might comprise at least one of one or more electrical wires, one or more electrical cables, one or more coaxial cables, one or more fiber optic cables, one or more non-fiber network cables, one or more telephone cables, or one or more power cables, and/or the like.

According to some embodiments, at least one architectural wall panel might comprise two or more sets of cable ports and one or more sets of built-in cables each cable connecting two ports of a pair of the two or more sets of cable ports, each set of cable ports being disposed at one of a top side, a bottom side, a left side, or a right side, or the like, of the at least one architectural wall panel. Each set of built-in connecting cables might comprise at least one of one or more electrical wires, one or more electrical cables, one or more coaxial cables, one or more fiber optic cables, one or more non-fiber network cables, one or more telephone cables, or one or more power cables, and/or the like. Each set of cable ports might comprise a set of ports corresponding to the at least one of one or more electrical wires, one or more electrical cables, one or more coaxial cables, one or more fiber optic cables, one or more non-fiber network cables, one or more telephone cables, or one or more power cables, and/or the like.

While certain features and aspects have been described with respect to exemplary embodiments, one skilled in the art will recognize that numerous modifications are possible. For example, the methods and processes described herein may be implemented using hardware components. Further, while various methods and processes described herein may be described with respect to particular structural and/or functional components for ease of description, methods provided by various embodiments are not limited to any particular structural and/or functional architecture but instead can be implemented on any suitable hardware and/or configuration of hardware. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without-certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system of architectural wall panels, comprising:
a plurality of wall mounts, each of said plurality of said wall mounts being removably securable to a wall; and
one or more architectural wall panels, each of said architectural wall panels comprising:
a front face, the front face having one of a decorative pattern or architectural pattern thereon;
a rear face; and
two or more mounting protrusions, the two or more mounting protrusions being formed on a surface of the rear face and being spaced apart from adjacent mounting protrusions, each of said mounting protrusions and an adjacent mounting protrusion forming one or more vertical channels,
wherein each of said vertical channels has a size through which at least one cable can be disposed when said each of said architectural wall panels is mounted on the wall;
wherein the two or more mounting protrusions removably couple with the two or more corresponding wall mounts of the plurality of wall mounts that have been removably secured to the wall, thereby allowing said each of said architectural wall panels to mount on the wall.

2. The system of claim 1, wherein at least a portion of each architectural wall panel is made of a material comprising at least one of wood, polyurethane, fiberboard, plastic, metal, tile, ceramic, stone, vinyl, foam, fiberglass, or glass.

3. The system of claim 1, wherein the front face of each architectural wall panel comprises a portion that is at least one of opaque, transparent, semi-transparent, or frosted.

4. The system of claim 1, wherein at least a portion of each architectural wall panel is made of acoustic panel material that absorbs sound.

5. The system of claim 1, wherein at least one architectural wall panel further comprises one or more extendable interlocking devices, each extendable interlocking device being interlockable with a corresponding device mounted to an adjacent architectural wall panel.

6. The system of claim 5, wherein the one or more extendable interlocking devices are interlockable with one or more of at least one adjacent horizontal architectural wall panel or at least one adjacent vertical architectural wall panel.

7. The system of claim 6, wherein two or more adjacent architectural wall panels are interlockable with each other along at least one of a horizontal direction, a vertical direction, a diagonal direction, or a set of directions forming a geometric pattern.

8. The system of claim 1, wherein the two or more corresponding wall mounts are connected with each other, and wherein the two or more corresponding wall mounts comprise wall mountable attachments that allow the two or more corresponding wall mounts to mount to the wall, wherein the wall mountable attachments comprise at least one of double sided tape, removable tape, one or more pairs of hook and loop fasteners, one or more pairs of reclosable fasteners, one or more push fasteners, one or more screws, or wall mounting hardware.

9. The system of claim 8, wherein the two or more corresponding wall mounts further comprise a built-in spirit level.

10. The system of claim 8, wherein each of the two or more corresponding wall mounts further comprises at least one of a tab, a hook, an angled protrusion, a magnet, or a spring clamp, wherein each of the two or more mounting protrusions comprises at least one of a hook, a tab, an angled protrusion, a magnet, or a rod or tube respectively corresponding to the at least one of the tab, the hook, the angled protrusion, the magnet, or the spring clamp of the two or more corresponding wall mounts.

11. The system of claim 1, wherein at least one architectural wall panel comprises openings on at least a portion of each of at least one of a top, a bottom, a left side, or a right side, wherein the system further comprises one or more external architectural wall panels, wherein each of at least one architectural wall panel fits within each of one or more external architectural wall panels, the one or more external architectural wall panels covering each of one or more of the openings of the at least one architectural wall panel that fits within the one or more external architectural wall panels.

12. The system of claim 1, wherein at least one architectural wall panel comprises a removable panel, the removable panel being removably attached to a portion of the front face of the at least one architectural wall panel, wherein the portion of the front face is an opening through which the at least one cable can be disposed.

13. The system of claim 1, wherein the at least one cable comprises at least one of one or more electrical wires, one or more electrical cables, one or more coaxial cables, one or more fiber optic cables, one or more non-fiber network cables, one or more telephone cables, or one or more power cables.

14. The system of claim 1, wherein at least one architectural wall panel comprises two or more sets of cable ports and one or more sets of built-in cables, each cable connecting two ports of a pair of the two or more sets of cable ports, each set of cable ports being disposed at one of a top side, a bottom side, a left side, or a right side of the at least one architectural wall panel, wherein each set of built-in connecting cables comprises at least one of one or more electrical wires, one or more electrical cables, one or more coaxial cables, one or more fiber optic cables, one or more non-fiber network cables, one or more telephone cables, or one or more power cables, and wherein each set of cable ports comprises a set of ports corresponding to the at least one of one or more electrical wires, one or more electrical cables, one or more coaxial cables, one or more fiber optic cables, one or more non-fiber network cables, one or more telephone cables, or one or more power cables.

15. An architectural wall panel, comprising:
a front face, the front face having one of a decorative pattern or architectural pattern thereon;
a rear face; and
two or more mounting protrusions, the two or more mounting protrusions being formed on a surface of the rear face and being spaced apart from adjacent mounting protrusions, each of said mounting protrusions and an adjacent mounting protrusion forming one or more vertical channels,
wherein each of said vertical channels has a size through which at least one cable can be disposed when the architectural wall panel is mounted on a wall;
wherein the two or more mounting protrusions removably couple with two or more corresponding wall mounts that are removably secured to the wall, thereby allowing the architectural wall panel to mount on the wall.

16. The architectural wall panel of claim 15, wherein at least a portion of the architectural wall panel is made of a material comprising at least one of wood, polyurethane, fiberboard, plastic, metal, tile, ceramic, stone, vinyl, foam, fiberglass, or glass.

17. The architectural wall panel of claim 15, wherein the front face of the architectural wall panel comprises a portion that is at least one of opaque, transparent, semi-transparent, or frosted.

18. The architectural wall panel of claim 15, wherein at least a portion of the architectural wall panel is made of acoustic panel material that absorbs sound.

19. The architectural wall panel of claim 15, wherein each of the two or more mounting protrusions comprises at least one of a hook, a tab, an angled protrusion, a magnet, or a rod or tube respectively corresponding to the at least one of the tab, the hook, the angled protrusion, the magnet, or the spring clamp of each of the two or more corresponding wall mounts.

20. A method, comprising: removably securing a first set of two or more wall mounts of a plurality of wall mounts to a wall, the first set of two or more wall mounts being spaced apart to form one or more first vertical channels;
disposing at least one cable within at least one of the one or more first vertical channels; and
mounting a first architectural wall panel of a plurality of architectural wall panels on the first set of two or more wall mounts, the first architectural wall panel comprising:
a front face, the front face having one of a decorative pattern or architectural pattern thereon;
a rear face; and
two or more mounting protrusions, the two or more mounting protrusions being formed on a surface of the rear face and being spaced apart from adjacent mounting protrusions, each of said mounting protrusions and an adjacent mounting protrusion forming one or more second vertical channels, wherein each of said first and second vertical channels has a size through which the at least one cable is disposed when the architectural wall panel is mounted on the wall, the one or more second vertical channels aligning with the one or more first vertical channels;
wherein mounting the architectural wall panel comprises removably coupling the two or more mounting protrusions with the first set of two or more wall mounts that are removably secured to the wall.

21. The method of claim 20, further comprising:
removably securing other sets of two or more wall mounts of the plurality of wall mounts to the wall;
reversibly interlocking two or more adjacent architectural wall panels of the plurality of architectural wall panels using two or more extendable interlocking devices; and
mounting the interlocked two or more adjacent architectural wall panels on corresponding sets of the other sets of two or more wall mounts that are removably secured to the wall.

22. The method of claim 20, further comprising:
removably securing one other set of two or more wall mounts of the plurality of wall mounts to the wall;
placing a second architectural wall panel of the plurality of architectural wall panels within an external architectural wall panel, the external architectural wall panel covering any openings along at least one of a top, a bottom, a left side, or a right side of the second architectural wall panel;
reversibly interlocking the second architectural wall panel to the external architectural wall panel; and
mounting the interlocked second architectural wall panel and external architectural wall panel to the one other set of two or more wall mounts.

* * * * *